United States Patent
Dutter

(10) Patent No.: US 10,414,949 B2
(45) Date of Patent: Sep. 17, 2019

(54) COATINGS AND COATING SYSTEMS CONTAINING HIGH DENSITY METAL MATERIAL

(71) Applicant: The Boeing Company, Chicago, IL (US)

(72) Inventor: Jason P. Dutter, Arlington, WA (US)

(73) Assignee: The Boeing Company, Chicago, IL (US)

( * ) Notice: Subject to any disclaimer, the term of this patent is extended or adjusted under 35 U.S.C. 154(b) by 277 days.

(21) Appl. No.: 15/635,155

(22) Filed: Jun. 27, 2017

(65) Prior Publication Data

US 2018/0371295 A1    Dec. 27, 2018

(51) Int. Cl.

| | | |
|---|---|---|
| *C09D 7/61* | (2018.01) | |
| *C09D 5/00* | (2006.01) | |
| *B21J 15/48* | (2006.01) | |
| *B21J 5/12* | (2006.01) | |
| *C08K 3/14* | (2006.01) | |
| *C08K 3/08* | (2006.01) | |
| *C09J 11/04* | (2006.01) | |
| *C08J 5/12* | (2006.01) | |
| *B25F 5/00* | (2006.01) | |
| *B21J 15/10* | (2006.01) | |
| *B21J 15/12* | (2006.01) | |
| *B21J 15/14* | (2006.01) | |
| *B21J 15/30* | (2006.01) | |

(52) U.S. Cl.
CPC ............ *C09J 11/04* (2013.01); *B21J 15/105* (2013.01); *B21J 15/12* (2013.01); *B21J 15/142* (2013.01); *B21J 15/30* (2013.01); *B21J 15/48* (2013.01); *B25F 5/006* (2013.01); *C08J 5/12* (2013.01); *C09D 5/00* (2013.01); *C09D 7/61* (2018.01); *C08J 2323/02* (2013.01); *C08K 3/08* (2013.01); *C08K 3/14* (2013.01); *C08K 2201/003* (2013.01)

(58) Field of Classification Search
None
See application file for complete search history.

(56) References Cited

U.S. PATENT DOCUMENTS

| | | | | |
|---|---|---|---|---|
| 6,045,750 | A  * | 4/2000 | Drake | B22F 7/06 419/6 |
| 6,048,379 | A  * | 4/2000 | Bray | C08K 3/08 102/517 |
| 6,815,066 | B2 | 11/2004 | Elliott | |
| 2002/0079627 | A1* | 6/2002 | McCollough | F16F 1/373 267/107 |
| 2005/0137038 | A1 | 6/2005 | Vito et al. | |
| 2008/0226921 | A1 | 9/2008 | DeCristofaro et al. | |

* cited by examiner

*Primary Examiner* — Sheeba Ahmed

(57) ABSTRACT

A coating applied to an article is provided. The coating has an adhesive material, in contact with at least one substrate of the article. The coating has a plurality of high density metal pellets disposed in the adhesive material. The high density metal pellets are in an amount of at least 90% by weight of the total weight percent of the coating, and each high density metal pellet has a diameter of at least 0.04 inch. The coating further has a polymer material. The coating is applied to the at least one substrate of the article to obtain a mass-enhanced, coated article. The coating has a coating thickness of at least 0.25 inch. The coating thickness and the amount of high density metal pellets are sufficient to provide an attenuation of vibration of the coated article and a reduced risk of unwanted ergonomic effects.

20 Claims, 15 Drawing Sheets

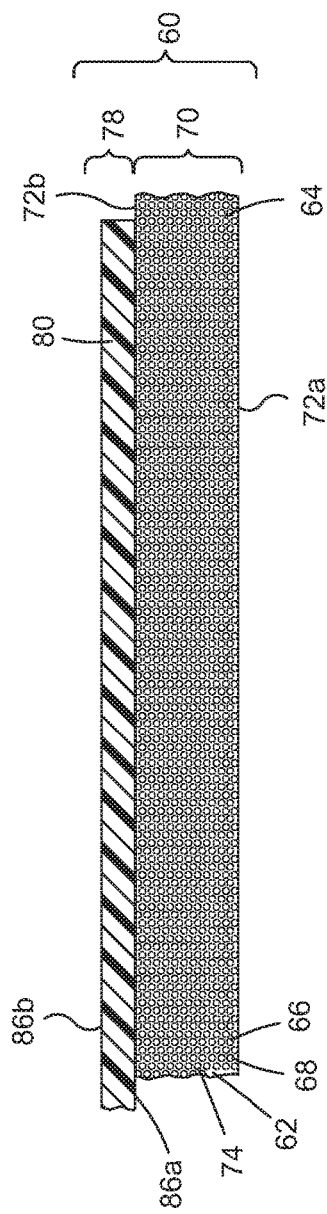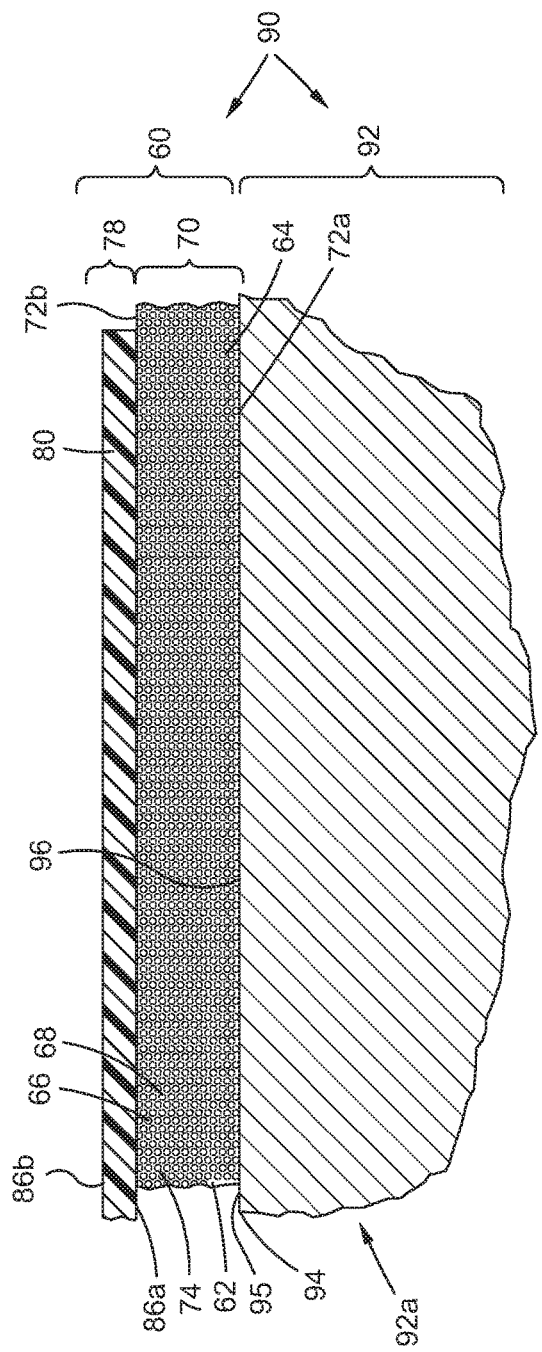

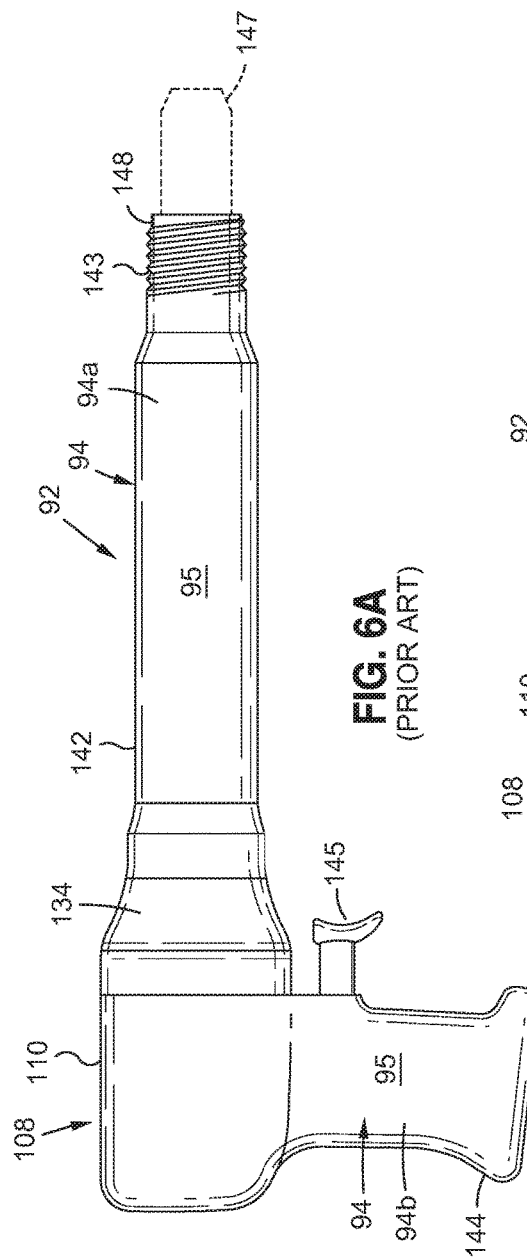
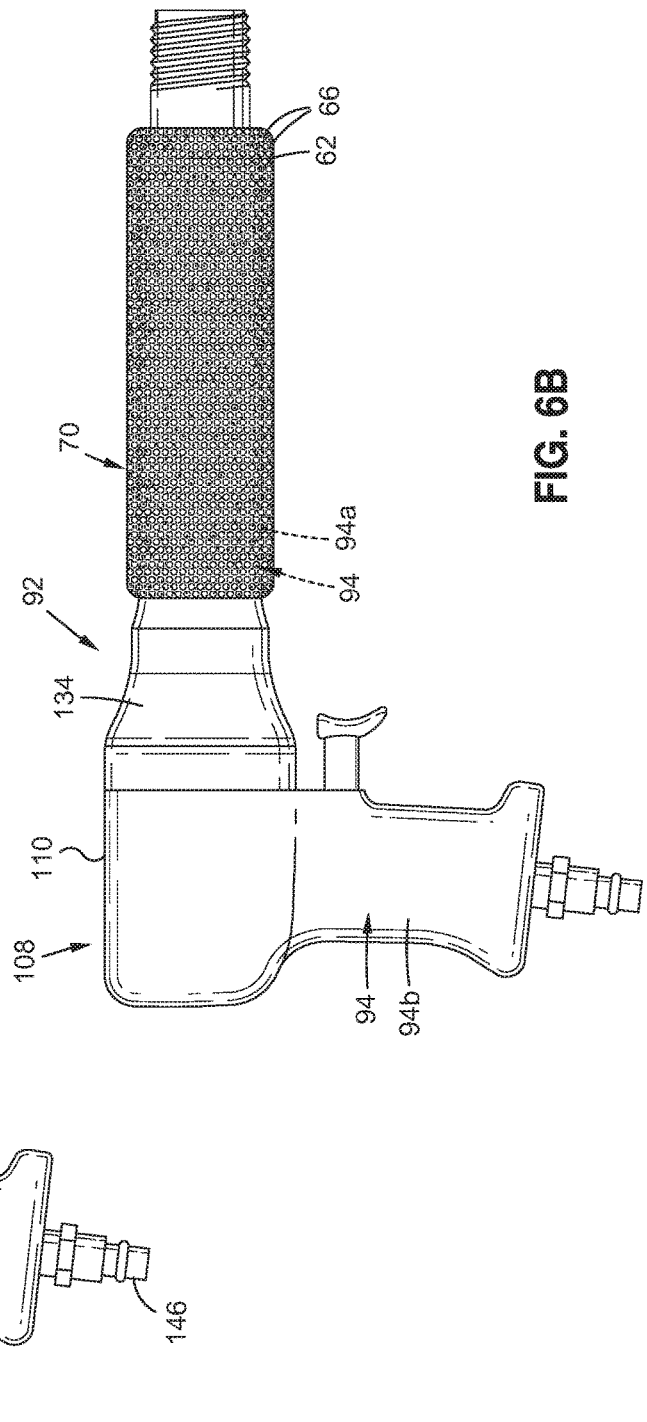
FIG. 6A (PRIOR ART)
FIG. 6B

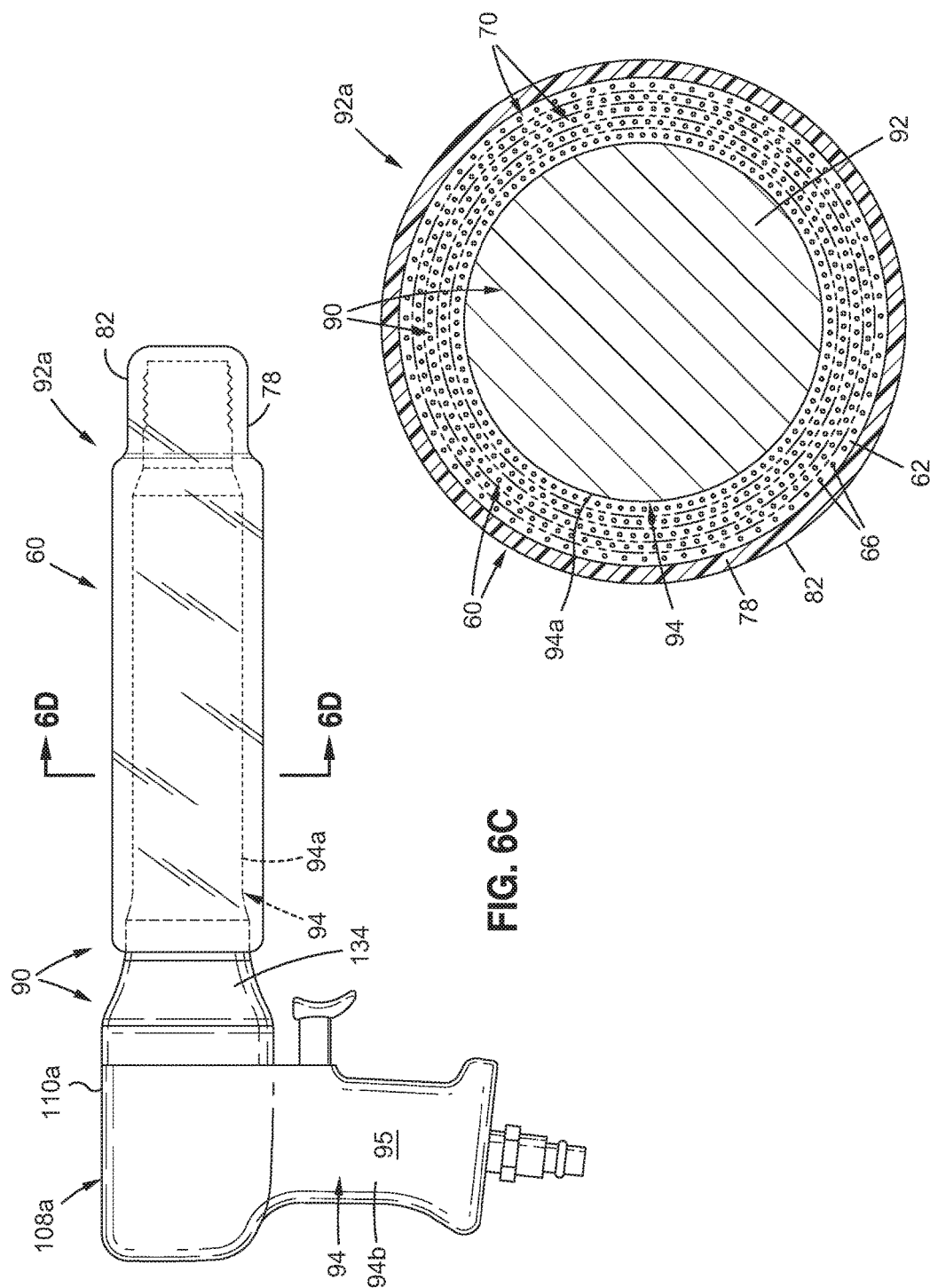

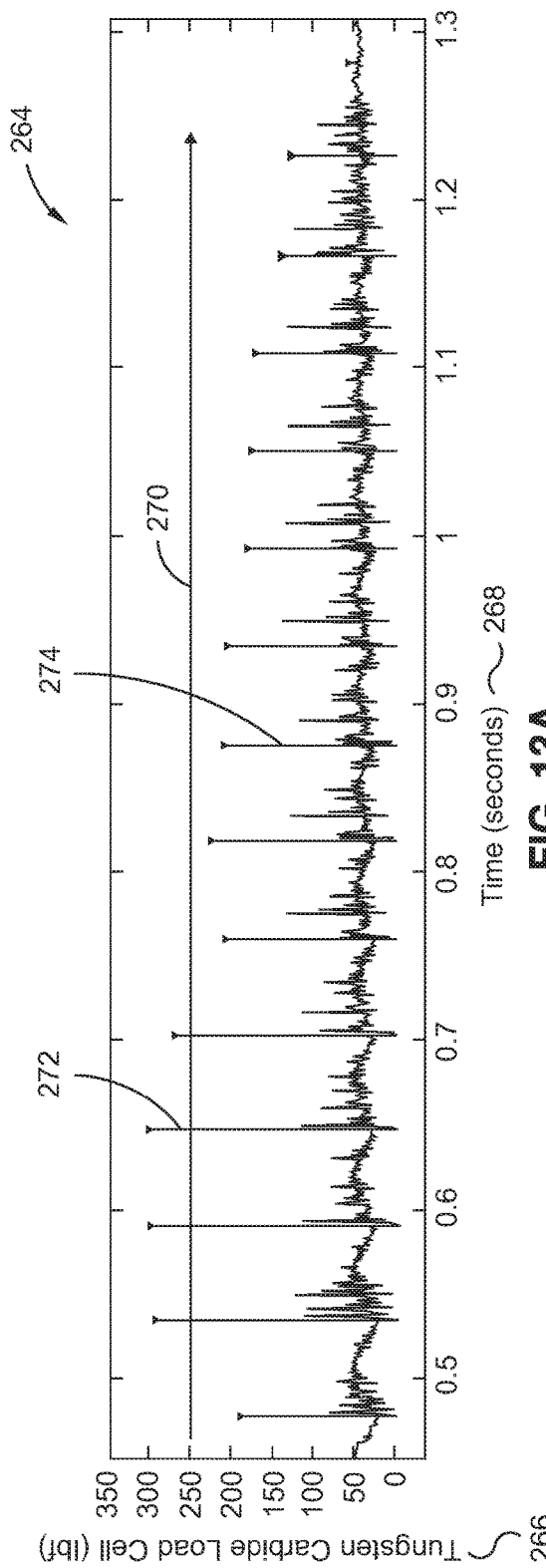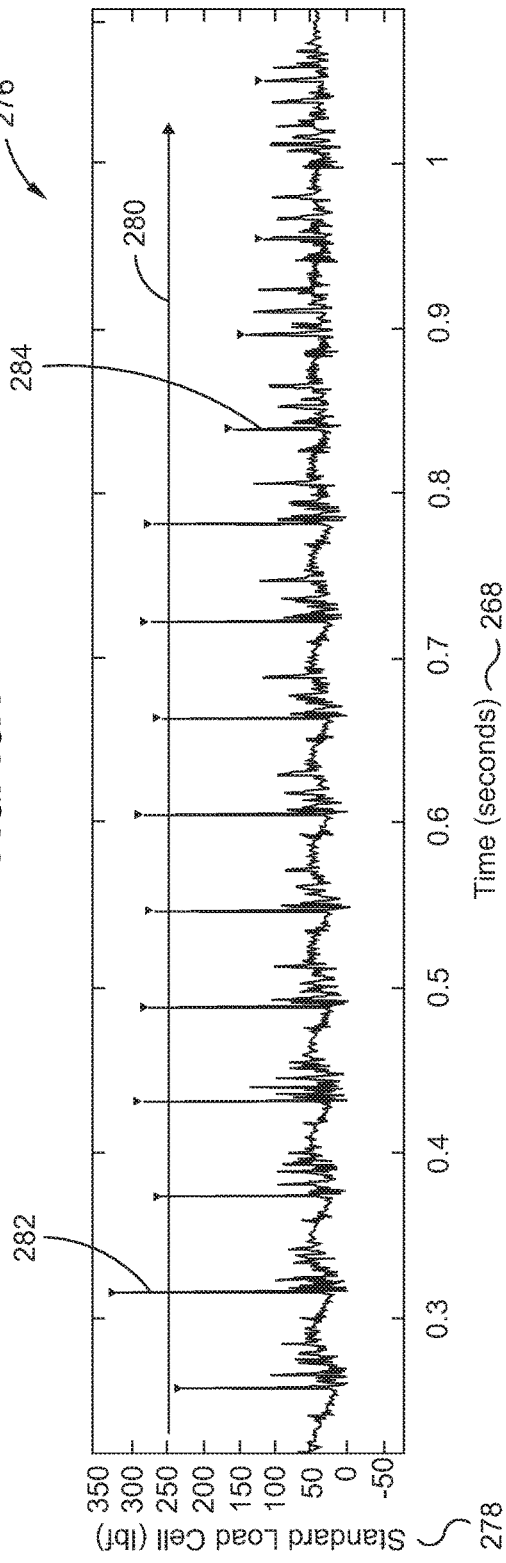

COATINGS AND COATING SYSTEMS CONTAINING HIGH DENSITY METAL MATERIAL

CROSS REFERENCE TO RELATED APPLICATION

This nonprovisional patent application is related to contemporaneously filed U.S. nonprovisional patent application Ser. No. 15/635,167, titled METHODS OF MAKING COATINGS CONTAINING HIGH DENSITY METAL MATERIAL AND MAKING COATED ARTICLES WITH THE SAME, filed on Jun. 27, 2017, the contents of which are hereby incorporated by reference in its entirety.

BACKGROUND

1) Field of the Disclosure

The disclosure relates generally to coatings and coating systems for application to articles, and methods for the same, and more particularly, to coatings and coating systems containing high density metal material, for application to articles, such as percussive tools, for example, rivet guns, and methods for the same.

2) Description of Related Art

Known fasteners in the form of rivets, bolts, and the like, are used in numerous applications in the aerospace, automotive, construction, and other industries, to fasten one structure to another structure. For example, in the aerospace industry, fasteners in the form of rivets and bolts are typically used to fasten aircraft structures, such as wing panels, fuselage panels, and tail panels, together or to a substructure, and to fabricate structural assemblies. A single aircraft may incorporate hundreds of thousands of fasteners in the form of rivets and bolts, and in the case of very large aircraft may incorporate over a million of such fasteners.

Such fasteners, in the form of rivets and bolts, may typically be installed in aircraft and other structures using a percussive tool, such as a rivet gun, also known as a pneumatic hammer. In many cases, such rivet guns are hand-held by human users, and in some cases, such rivet guns may be robotic-held by automated robots. The rivet gun is used against a head side of the rivet or bolt to drive the rivet or bolt into a structure or structures, and a bucking bar may be used on a tail side of the rivet or bolt. A bucking bar is a solid block or bar typically made of steel, tungsten, or another high density heavy metal, that is used to back up a rivet while it is being installed and set. The energy from the rivet gun drives the rivet or bolt against the inertia of the bucking bar. Typical riveting methods and devices for installing rivets or bolts into a structure or structures, such as aircraft structures, may expose users to repetitive motion and unwanted ergonomic effects, such as prolonged or repetitive exposure or contact to the vibrations associated with riveting.

Known vibration dampening methods and devices for percussive tools, such as rivet guns, exist. Such known vibration dampening methods and devices for percussive tools, such as rivet guns, may include the use of springs, air, or viscoelastic materials incorporated in or on the rivet gun. However, the use of such known springs, air, or viscoelastic materials incorporated in or on the rivet gun may result in decreased tactile sensory feedback or loss of tactile sensory feedback by the user.

In addition, another known vibration dampening device for use with percussive tools, such as rivet guns, includes vibration dampening gloves incorporating a gel material or a spongy material that may be worn by rivet gun users while riveting. However, while such known vibration dampening gloves may be effective for low impact riveting, such known vibration dampening gloves may not be effective for high impact riveting.

Further, another known vibration dampening device includes a recoilless rivet gun that provides a gentler impact than typical rivet guns. However, such known recoilless rivet guns may take longer to drive a rivet or bolt, and the user may still be subject to vibration with longer drive times. Moreover, while such known recoilless rivet guns may be effective for low impact riveting, such known recoilless rivet guns may not be effective for high impact riveting.

In addition, known percussive tools, such as a rivet guns, are typically made of metal, and when the rivet gun is used to install fasteners in metal structures, i.e., aluminum structures, the rivet gun may be difficult to control due to the vibratory impact. Such rivet gun instability, while in use, may result in unwanted tool marks made by the metal rivet gun on the metal fastened or riveted structures or parts.

Further, while prior studies have shown improved ergonomics associated with adding mass to bucking bars used with rivet guns, adding mass to rivet guns to improve ergonomics is not believed to be known.

Accordingly, there is a need in the art for improved coatings and coating systems and methods for the same, used to coat and add mass to articles, such as percussive tools, for example, rivet guns, that provide attenuation of vibration and reduced risk of unwanted ergonomic effects, and that provide advantages over known coatings, coating systems, and methods.

SUMMARY

This need for improved coatings, coating systems, and methods for the same, is satisfied. As discussed in the below detailed description, embodiments of the improved coatings, coating systems, and methods for the same, may provide significant advantages over known coatings, coating systems, and methods.

In an embodiment of the disclosure, there is provided a coating applied to an article. The coating comprises an adhesive material, in contact with at least one substrate of the article. The coating further comprises a plurality of high density metal pellets disposed in the adhesive material. The plurality of high density metal pellets is in an amount of at least 90% (ninety percent) by weight of the total weight percent of the coating, and each high density metal pellet has a diameter of at least 0.04 inch.

The coating further comprises a polymer material. The coating is applied to the at least one substrate of the article to obtain a mass-enhanced, coated article. The coating has a coating thickness of at least 0.25 inch. The coating thickness and the amount of high density metal pellets are sufficient to provide an attenuation of vibration of the coated article and a reduced risk of unwanted ergonomic effects.

In another embodiment of the disclosure, there is provided a coating applied to a percussive tool. The coating comprises an adhesive material, in contact with at least one substrate of the percussive tool. The coating further comprises a plurality of tungsten carbide pellets disposed in the adhesive material. The plurality of tungsten carbide pellets is in an amount of at least 90% (ninety percent) by weight of the total weight percent of the coating. Each tungsten carbide pellet has a diameter of at least 0.04 inch.

The coating further comprises a polymer material. The coating is applied to the at least one substrate of the percussive tool to obtain a mass-enhanced, coated percussive tool. The coating has a coating thickness of at least 0.25 inch. The coating thickness and the amount of tungsten carbide pellets are sufficient to provide an attenuation of vibration of the coated percussive tool and a reduced risk of unwanted ergonomic effects.

In another embodiment of the disclosure, there is provided a coating system. The coating system comprises an article having at least one substrate configured to be coated. The coating system further comprises a coating.

The coating comprises an adhesive material. The coating further comprises a plurality of high density metal pellets disposed in the adhesive material to form a metal adhesive matrix. The plurality of high density metal pellets is in an amount of at least 90% (ninety percent) by weight of the total weight percent of the coating. Each high density metal pellet has a diameter of at least 0.04 inch. The coating further comprises a polymer material applied over the metal adhesive matrix.

The coating is applied to the at least one substrate of the article to obtain a mass-enhanced, coated article. The adhesive material of the coating is in contact with the at least one substrate. The coating has a coating thickness of at least 0.25 inch. The coating thickness and the amount of high density metal pellets are sufficient to provide an attenuation of vibration of the coated article and a reduced risk of unwanted ergonomic effects.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 4A is a cross-sectional view of an embodiment of a coating of the disclosure;

FIG. 4B is a cross-sectional view of an embodiment of a coating system of the disclosure;

FIG. 6A is an elevation view of a known article, in the form of a percussive tool, such as a rivet gun;

FIG. 6B is an elevation view of the known article, in the form of the percussive tool, such as the rivet gun, of FIG. 6A, showing a barrel substrate coated with a metal adhesive matrix portion of an embodiment of a coating of the disclosure;

FIG. 6C is an elevation view of a coated article, in the form of a coated percussive tool, such as a coated rivet gun, showing the barrel substrate coated with an embodiment of a coating of the disclosure;

FIG. 6D is a cross-sectional view taken along the lines 6D-6D of FIG. 6C;

FIG. 13A is a loading profile graph for measurements from a load cell for a coated rivet gun, coated with an embodiment of a coating of the disclosure;

FIG. 13B is a loading profile graph for measurements from a load cell for a rivet gun without a coating of the disclosure.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art.

Figure 1:
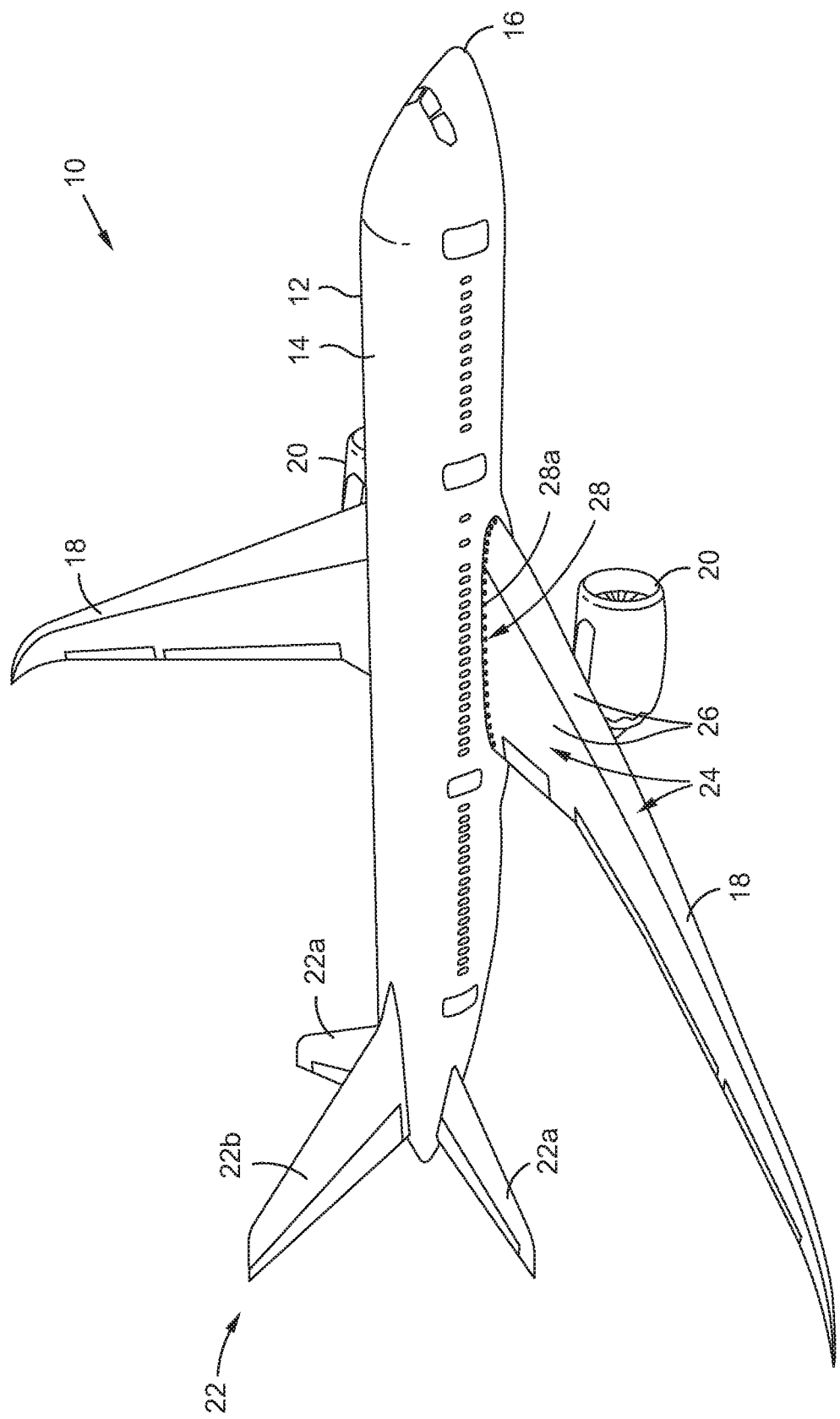
FIG. 1 is an illustration of a perspective view of an vehicle that may incorporate one or more structures joined together with fasteners installed using an embodiment of a coating system and a coated article of the disclosure.

Now referring to the Figures, FIG. 1 is an illustration of a perspective view of an air vehicle 10, such as in the form of an aircraft 12, that may incorporate one or more structures 24, such as in the form of wing panels 26, joined together with fasteners 28, such as rivets 28a, installed using one or more embodiments of a coating system 90 (see FIGS. 4B, 5) and a coated article 92a (see FIGS. 4B, 5) of the disclosure.

FIG. 1 is an illustration of a perspective view of the air vehicle 10, such as in the form of aircraft 12. As shown in FIG. 1, the air vehicle 10, such as in the form of aircraft 12, comprises a fuselage 14, a nose 16, wings 18, engines 20, and an empennage 22 comprising horizontal stabilizers 22a and a vertical stabilizer 22b. As further shown in FIG. 1, the air vehicle 10, such as in the form of aircraft 12, may incorporate one or more structures 24, such as in the form of wing panels 26, joined together with fasteners 28, such as rivets 28a. For illustrative and exemplary purposes, only some of the fasteners 28, such as rivets 28a, are shown in FIG. 1, and such fasteners 28 are not drawn to scale. The air vehicle 10, such as in the form of aircraft 12, may typically incorporate hundreds of thousands, or even millions, of such fasteners 28.

Although the aircraft 12 shown in FIG. 1 is generally representative of a commercial passenger aircraft, the teachings of the disclosed embodiments may be applied to structures joined together with fasteners 28, such as rivets 28a, for other passenger aircraft, cargo aircraft, military aircraft, rotorcraft, and other types of aircraft or aerial vehicles, as well as aerospace vehicles, satellites, space launch vehicles, rockets, and other aerospace vehicles, and other transport vehicles, such as boats and other watercraft, trains, automobiles, trucks, buses, or other suitable transport vehicles.

Figure 2:
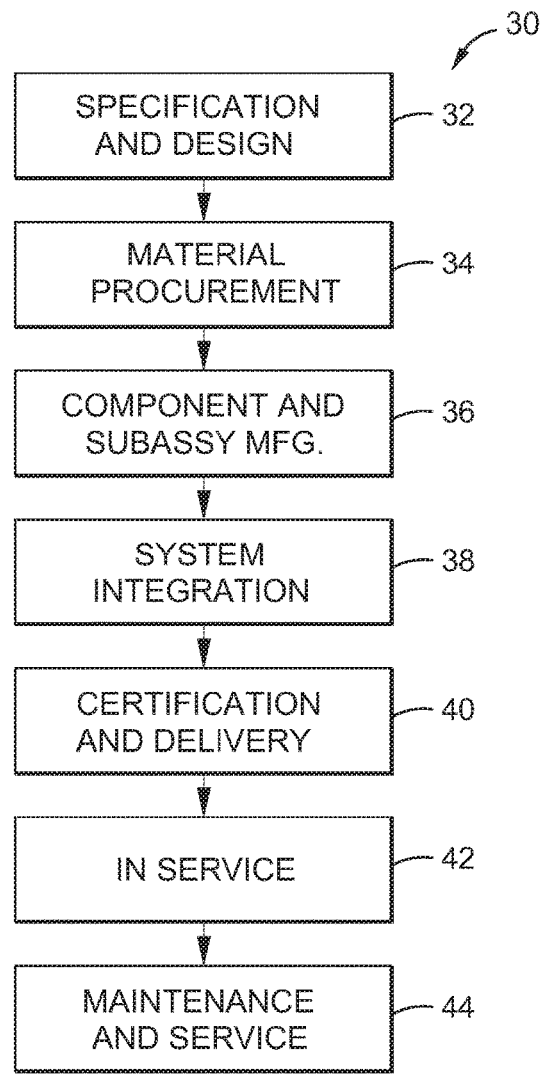
FIG. 2 is a flow diagram of an aircraft manufacturing and service method.
Figure 3:
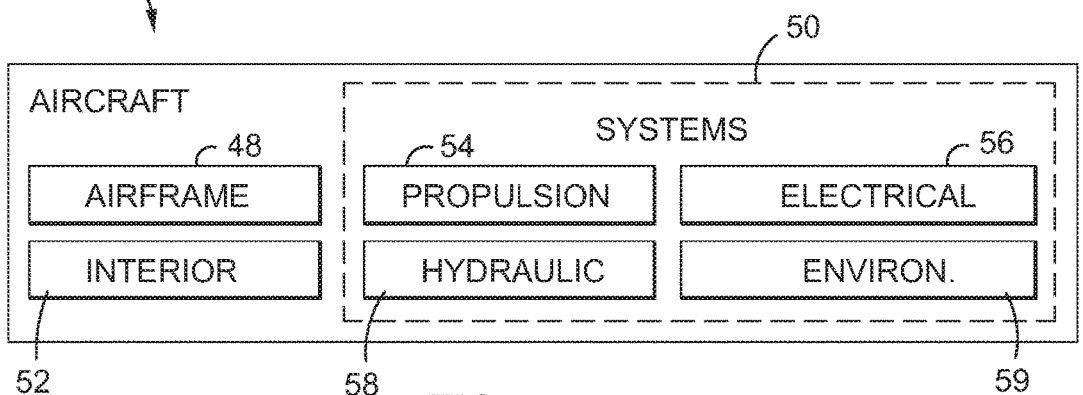
FIG. 3 is an illustration of a block diagram of an aircraft.

Now referring to FIGS. 2 and 3, FIG. 2 is a flow diagram of an aircraft manufacturing and service method 30, and FIG. 3 is an illustration of a block diagram of an aircraft 46. Embodiments of the disclosure may be described in the context of the aircraft manufacturing and service method 30, as shown in FIG. 2, and the aircraft 46, as shown in FIG. 3. During pre-production, the exemplary aircraft manufacturing and service method 30 (see FIG. 2) may include specification and design 32 (see FIG. 2) of the aircraft 46 (see FIG. 3) and material procurement 34 (see FIG. 2). During manufacturing, component and subassembly manufacturing 36 (see FIG. 2) and system integration 38 (see FIG. 2) of the aircraft 46 (see FIG. 3) takes place. Thereafter, the aircraft 46 (see FIG. 3) may go through certification and delivery 40 (see FIG. 2) in order to be placed in service 42 (see FIG. 2). While in service 42 (see FIG. 2) by a customer, the aircraft 46 (see FIG. 3) may be scheduled for routine maintenance and service 44 (see FIG. 2), which may also include modification, reconfiguration, refurbishment, and other suitable services.

Each of the processes of the aircraft manufacturing and service method 30 (see FIG. 2) may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may include an airline, leasing company, military entity, service organization, and other suitable operators.

As shown in FIG. 3, the aircraft 46 produced by the exemplary aircraft manufacturing and service method 30 may include an airframe 48 with a plurality of systems 50 and an interior 52. As further shown in FIG. 3, examples of the systems 50 may include one or more of a propulsion system 54, an electrical system 56, a hydraulic system 58, and an environmental system 59. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 30 (see FIG. 2). For example, components or subassemblies corresponding to component and subassembly manufacturing 36 (see FIG. 2) may be fabricated or manufactured in a manner similar to components or subassemblies produced while the aircraft 46 (see FIG. 3) is in service 42 (see FIG. 2). Also, one or more apparatus embodiments, method embodiments, or a combination thereof, may be utilized during component and subassembly manufacturing 36 (see FIG. 2) and system integration 38 (see FIG. 2), for example, by substantially expediting assembly of or reducing the cost of the aircraft 46 (see FIG. 3). Similarly, one or more of apparatus embodiments, method embodiments, or a combination thereof, may be utilized while the aircraft 46 (see FIG. 3) is in service 42 (see FIG. 2), for example and without limitation, to maintenance and service 44 (see FIG. 2).

Now referring to FIG. 4A, FIG. 4A is a cross-sectional view of an embodiment of a coating 60 of the disclosure. As shown in FIG. 4A, the coating 60 comprises an adhesive material 62. The adhesive material 62 (see FIG. 4A) is preferably a binder material 64 (see FIG. 4A). The adhesive material 62 (see FIGS. 4A, 5) preferably comprises one or more of, a viscoelastic adhesive 62a (see FIG. 5), a mastic viscoelastic adhesive 62b (see FIG. 5), a hot-melt adhesive 62c (see FIG. 5), a spray adhesive 62d (see FIG. 5), a liquid adhesive 62e (see FIG. 5), an adhesive glue 62f (see FIG. 5), a pressure sensitive adhesive 62g (see FIG. 5), or another suitable adhesive material 62. An exemplary adhesive material 62 that may be used includes SUPER 77 spray adhesive obtained from 3M Company of St. Paul, Minn. (SUPER 77 is a registered trademark of 3M Company of St. Paul, Minn.) The adhesive material 62 is sufficiently viscous and firm to be able to hold a plurality of high density metal pellets 66 (see FIGS. 4A, 5, 6B) in place.

Preferably, the coating 60 (see FIG. 4A) includes a sufficient amount of adhesive material 62 in an amount comprising 1% (one percent) by weight to 9% (nine percent) by weight of the total weight percent of the coating 60. More preferably, the coating 60 (see FIG. 4A) includes a sufficient amount of adhesive material 62 in an amount comprising 4.39%.

As shown in FIG. 4A, the coating 60 further comprises a plurality of high density metal pellets 66 disposed in, or embedded in, the adhesive material 62. The plurality of high density metal pellets 66 (see FIG. 4A) comprises a high density metal material 68 (see FIG. 4A) and may be in the form of shot pellets or another suitable form. As used herein, "high density metal material" means a metal material having a density greater than 7 g/cm$^3$ (seven grams per cubic centimeter), where density is the mass of the metal material per unit of volume of the metal material, and further means the metal material is very durable and strong, for example, high impact strength.

Preferably, the high density metal material 68 (see FIGS. 4A, 5) comprises one or more of, tungsten carbide 68a (see FIG. 5), tungsten 68b (see FIG. 5), iron 68c (see FIG. 5), copper 68d (see FIG. 5), nickel 68e (see FIG. 5), lead 68f (see FIG. 5), molybdenum 68g (see FIG. 5), steel 68h (see FIG. 5), inconel 68i (see FIG. 5), platinum 68j (see FIG. 5), tin 68k (see FIG. 5), silver 68l (see FIG. 5), zinc 68m (see FIG. 5), bronze 68n (see FIG. 5), and alloys 68o (see FIG. 5) of one or more of the high density metal materials 68 thereof, i.e., tungsten carbide, tungsten iron, copper, nickel, lead, molybdenum, steel, inconel, platinum, tin, silver, zinc, bronze, or another suitable high density metal material 68. The approximate densities in grams per cubic centimeter (g/cm$^3$) for each of the preferred high density metal materials 68 include the following: tungsten carbide (15.63 g/cm$^3$), tungsten (19.25 g/cm$^3$), iron (7.87 g/cm$^3$), copper (8.96 g/cm$^3$), nickel (8.90 g/cm$^3$), lead (11.34 g/cm$^3$), molybdenum (10.20 g/cm$^3$), steel (ranges between about 7.75-8.05 g/cm$^3$, depending on the alloying constituents), inconel (19.25 g/cm$^3$), platinum (21.45 g/cm$^3$), tin (7.3 g/cm³), silver (10.49 g/cm³), zinc (7.14 g/cm³), and bronze (ranges between about 8.14-8.89 g/cm³, depending on the alloying constituents).

Figure 5:
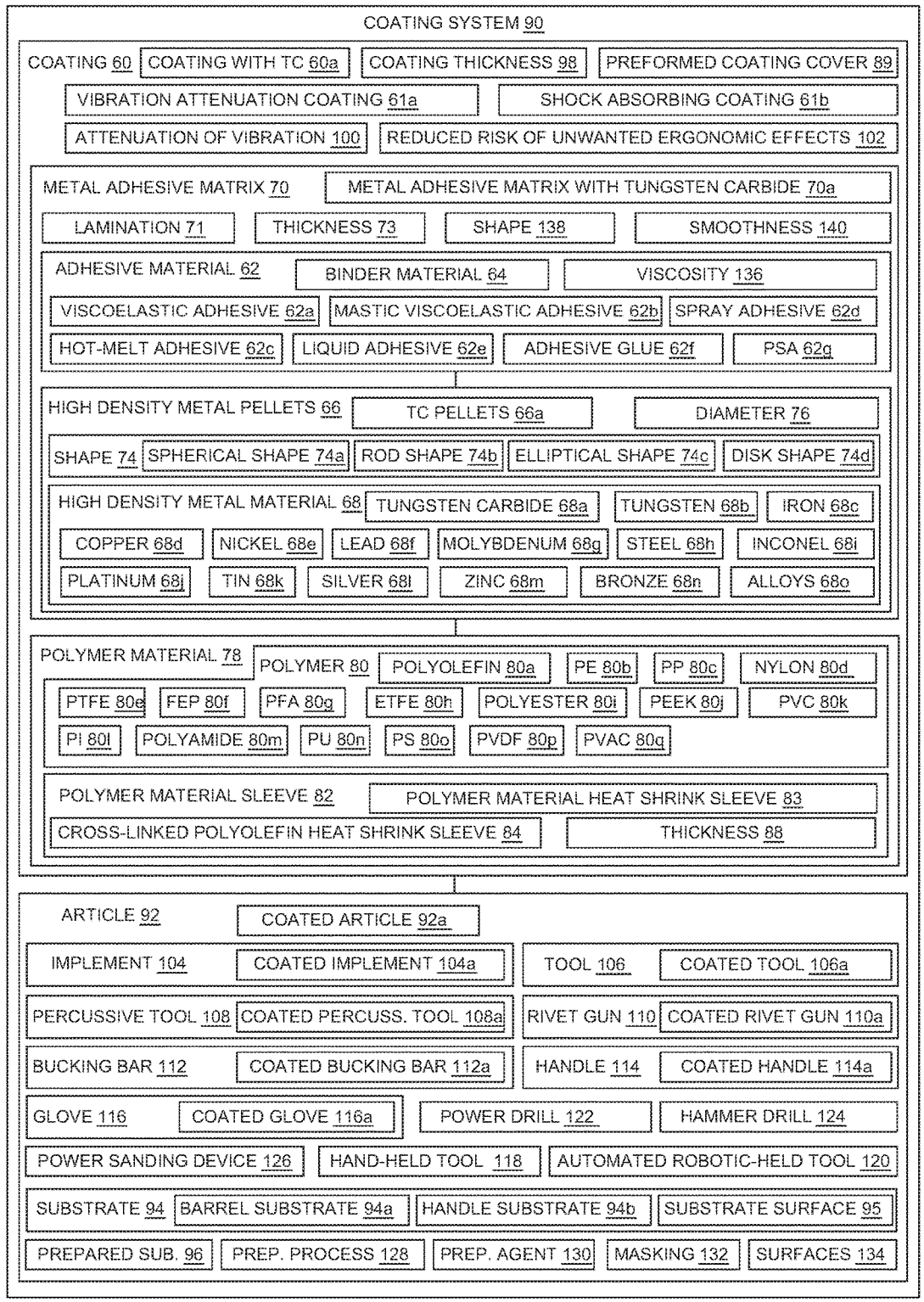
FIG. 5 is a block diagram of embodiments of a coating system and a coating of the disclosure.

More preferably, the high density metal material 68 is tungsten carbide 68a (see FIG. 5). Preferably, the plurality of high density metal pellets 66 (see FIGS. 4A, 5) comprises a plurality of tungsten carbide pellets 66a (see FIG. 5). Tungsten carbide is a preferred high density metal material to use due to its high strength, toughness, and durability, and its high melting point of approximately 2,870° C. (5,200 F.) and low coefficient of thermal expansion of 5.5 μm/(m·K). Preferably, the tungsten carbide is in the form of pellets or beads and can be pressed and formed into shape over and/or around the substrate 94 to be coated.

As shown in FIG. 4A, the adhesive material 62, together with the plurality of high density metal pellets 66 pellets disposed in or embedded in the adhesive material 62, comprise a metal adhesive matrix 70.

Preferably, the metal adhesive matrix 70 (see FIG. 4A) includes a sufficient amount of adhesive material 62 in an amount comprising 1% (one percent) by weight to 9% (nine percent) by weight of the total weight percent of the metal adhesive matrix 70. Preferably, the metal adhesive matrix 70 (see FIG. 4A) includes a sufficient amount of high density metal pellets 66 (see FIG. 5) in an amount comprising 91% (ninety-one percent) by weight to 99% (ninety-nine percent) by weight of the total weight percent of the metal adhesive matrix 70. The inventor ascertained that an amount of high density material comprising tungsten carbide pellets 66a that is less than 90% does not provide adequate attenuation of vibration, and has determined that the amount of adhesive material 62 comprising 1% (one percent) by weight to 9% (nine percent) by weight, and the amount of tungsten carbide pellets 66a comprising 91% (ninety-one percent) by weight to 99% (ninety-nine percent) by weight of the total weight percent of the metal adhesive matrix, are sufficient to provide an attenuation of vibration 100 of a coated article 92a and a reduced risk of unwanted ergonomic effects 102.

As further shown in FIG. 4A, the metal adhesive matrix 70 has a first side 72a and a second side 72b. Preferably, the metal adhesive matrix 70 (see FIGS. 4A, 5) has a thickness 73 (see FIG. 5) in a range of 0.20 inch to 0.49 inch. More preferably, the metal adhesive matrix 70 (see FIGS. 4A, 5) has a thickness 73 (see FIG. 5) in a range of 0.30 inch to 0.35 inch.

Preferably, each high density metal pellet 66 (see FIG. 4A) has a diameter 76 (see FIG. 5) of at least 0.04 inch, or greater than 1 mm (one millimeter). More, preferably, each high density metal pellet 66 has a diameter 76 (see FIG. 5) in a range of 0.040 inch to 0.10 inch. The high density metal pellets 66 (see FIG. 5) may all be of the same or uniform size, or may be of different or varying sizes within the preferred diameter range. For example, smaller diameter high density metal pellets 66 may improve the packing efficiency of the high density metal pellets 66, and larger diameter high density metal pellets 66 may be more durable and have improved wear performance.

Each high density metal pellet 66 has a shape 74 (see FIG. 5) or configuration. The shape 74 (see FIG. 5) may comprise a spherical shape 74a (see FIG. 5), a rod shape 74b (see FIG. 5), an elliptical shape 74c (see FIG. 5), a disk shape 74d (see FIG. 5), or another suitable shape.

Preferably, the coating 60 (see FIG. 4A) has an amount of high density metal pellets 66 (see FIG. 4A) of at least 90% (ninety percent) by weight of the total weight percent of the coating 60. More preferably, the coating 60 has an amount of high density metal pellets 66 comprising 90% (ninety percent) by weight to 98% (ninety-eight percent) by weight of the total weight percent of the coating 60.

As shown in FIG. 4A, the coating 60 further comprises a polymer material 78. The polymer material 78 (see FIGS. 4A, 5) is formed of one or more polymers 80 (see FIGS. 4A, 5) comprising one or more of, polyolefin 80a (see FIG. 5), polyethylene (PE) 80b (see FIG. 5), polypropylene (PP) 80c (see FIG. 5), nylon 80d (see FIG. 5), polytetrafluoroethylene (PTFE) 80e, (see FIG. 5) fluorinated ethylene propylene (FEP) 80f (see FIG. 5), perfluoroalkoxy alkanes (PFA) 80g (see FIG. 5), ethylene tetrafluoroethylene (ETFE) 80h (see FIG. 5), polyester 80i (see FIG. 5), polyether ether ketone (PEEK) 80j (see FIG. 5), polyvinyl chloride (PVC) 80k (see FIG. 5), polyimide (PI) 80l (see FIG. 5), polyamide 80m (see FIG. 5), polyurethane (PU) 80n (see FIG. 5), polystyrene (PS) 80o (see FIG. 5), polyvinylidene fluoride (PVDF) 80p (see FIG. 5), polyvinyl acetate (PVAC) 80q (see FIG. 5), or another suitable polymer. More preferably, the polymer material 78 (see FIG. 5) is formed of the polymer 80 (see FIG. 5) comprising polyolefin 80a (see FIG. 5).

Preferably, the coating 60 (see FIG. 4A) has an amount of polymer material 78 (see FIG. 4A) in an amount comprising 1.0% (one percent) by weight to 5.0% (five percent) by weight of the total weight percent of the coating 60.

The polymer material 78 (see FIGS. 4A, 5) is preferably in the form of a polymer material sleeve 82 (see FIG. 5). More preferably, the polymer material 78 (see FIG. 5) is in the form of a polymer material heat shrink sleeve 83 (see FIG. 5). Most preferably, the polymer material 78 (see FIG. 5) is in the form of a cross-linked polyolefin heat shrink sleeve 84 (see FIG. 5). As shown in FIG. 4A, the polymer material 78 has a first side 86a and a second side 86b. As further shown in FIG. 4A, the first side 86a of the polymer material 78 is adjacent the second side 72b of the metal adhesive matrix 70. The polymer material 78 preferably has a thickness 88 of about 0.00045 inch to 0.12 inch.

Now referring to FIGS. 4B and 5, FIG. 4B is a cross-sectional view of an embodiment of a coating system 90 of the disclosure. FIG. 5 is a block diagram of embodiments of the coating system 90 and the coating 60 of the disclosure.

As shown in FIGS. 4B and 5, the coating system 90 comprises the coating 60, as discussed above with respect to FIG. 4A. As shown in FIG. 5, the coating 60 may comprise, in a preferred embodiment, a coating 60a with tungsten carbide. The coating 60 (see FIG. 5) is preferably in the form of a vibration attenuation coating 61a (see FIG. 5) and a shock absorbing coating 61b (see FIG. 5).

The coating 60 (see FIGS. 4B, 5) comprises the adhesive material 62 (see FIGS. 4B, 5). The adhesive material 62 (see FIGS. 4B, 5) is preferably a binder material 64 (see FIGS. 4B, 5), and as shown in FIG. 5, comprises one or more of, a viscoelastic adhesive 62a, a mastic viscoelastic adhesive 62b, a hot-melt adhesive 62c, a spray adhesive 62d, a liquid adhesive 62e, an adhesive glue 62f, a pressure sensitive adhesive 62g, or another suitable adhesive material 62.

As shown in FIGS. 4B and 5, the coating 60 further comprises the plurality of high density metal pellets 66 disposed or embedded in the adhesive material 62. The plurality of high density metal pellets 66 (see FIG. 4B) comprises a high density metal material 68 (see FIG. 4B) comprising, as shown in FIG. 5, one or more of, tungsten carbide 68a (see FIG. 5), tungsten 68b (see FIG. 5), iron 68c (see FIG. 5), copper 68d (see FIG. 5), nickel 68e (see FIG. 5), lead 68f (see FIG. 5), molybdenum 68g (see FIG. 5), steel 68h (see FIG. 5), inconel 68i (see FIG. 5), platinum 68j (see FIG. 5), tin 68k (see FIG. 5), silver 68l (see FIG. 5), zinc 68m (see FIG. 5), bronze 68n (see FIG. 5), and alloys 68o

(see FIG. 5) of one or more of the high density metal materials 68 thereof. As shown in FIG. 5, the plurality of high density metal pellets 66 preferably comprises a plurality of tungsten carbide pellets 66a. Preferably, each high density metal pellet 66 (see FIG. 5) has a diameter 76 (see FIG. 5) of at least 0.04 inch, as discussed above.

The adhesive material 62 (see FIGS. 4B, 5), together with the plurality of high density metal pellets 66 (see FIGS. 4B, 5), comprises the metal matrix adhesive 70 (see FIGS. 4B, 5). As shown in FIG. 4B, the metal adhesive matrix 70 has the first side 72a and the second side 72b. As shown in FIG. 5, the metal matrix adhesive 70 preferably comprises a metal matrix adhesive 70a comprising tungsten carbide.

As shown in FIGS. 4B and 5, the coating 60 further comprises the polymer material 78. The polymer material 78 (see FIGS. 4B, 5) is formed of one or more polymers 80 (see FIGS. 4B, 5) comprising one or more of the polymers 80, as discussed above and shown in FIG. 5. As shown in FIG. 4B, the polymer material 78 has the first side 86a and the second side 86b. As shown in FIG. 5, the polymer material 78 has a thickness 88, and may be in the form of a polymer material sleeve 82, a polymer material heat shrink sleeve 83, a cross-linked polyolefin heat shrink sleeve 84, or another suitable form. Preferably, the polymer material 78 (see FIG. 5) comprises the polymer material sleeve 82 (see FIG. 5) applied over the metal adhesive matrix 70 (see FIG. 5). The high density metal material 68 (see FIG. 5), such as in the form of high density metal pellets 66 (see FIG. 5), for example, tungsten carbide pellets 66a (see FIG. 5), or shot, may also be laminated via lamination 71 (see FIG. 5).

As shown in FIGS. 4B and 5, the coating system 90 further comprises an article 92 having at least one substrate 94 configured to be coated with the coating 60. The at least one substrate 94 (see FIGS. 4B, 5) has one or more substrate surfaces 95 (see FIGS. 4B, 5). The at least one substrate 94 (see FIGS. 4B, 5) may preferably be prepared prior to applying the coating 60 (see FIGS. 4B, 5), with a preparation process 128 (see FIG. 5) and one or more preparation agents 130 (see FIG. 5), and with masking 132 (see FIG. 5) of one or more surfaces 134 (see FIG. 5) of the article 92 (see FIG. 5), to obtain a prepared substrate 96 (see FIGS. 4B, 5). Preparing the substrate 94 (see FIGS. 4B, 5) is discussed in more detail below with respect to the methods disclosed herein. Exemplary substrates 94 (see FIG. 5) to be coated on the article 92 (see FIG. 5) may include a barrel substrate 94a (see FIGS. 5, 6A) of a rivet gun 110 (see FIGS. 5, 6A), a handle substrate 94b (see FIGS. 5, 6A) of a rivet gun 110 (see FIGS. 5, 6A), or another suitable substrate 94 on an article 92 to be coated.

The coating 60 (see FIGS. 4B, 5) is applied to the at least one substrate 94 (see FIGS. 4B, 5), such as the prepared substrate 96 (see FIGS. 4B, 5), of the article 92 (see FIGS. 4B, 5), to obtain a mass-enhanced, coated article 92a (see FIGS. 4B, 5). The adhesive material 62 (see FIGS. 4B, 5) of the metal matrix adhesive 70 (see FIGS. 4B, 5) of the coating 60 (see FIGS. 4B, 5) is in contact with, and preferably in direct contact with, the substrate 94 (see FIG. 4B). Preferably, the coating 60 (see FIGS. 4B, 5) has a coating thickness 98 (see FIG. 5) of at least 0.25 inch. More preferably, the coating has a coating thickness 98 (see FIG. 5) in a range of 0.25 inch to 0.5 inch.

The coating thickness 98 (see FIG. 5) and the amount of high density metal pellets 66 (see FIGS. 4A-4B, 5) are sufficient to provide an attenuation of vibration 100 (see FIG. 5) of the coated article 92a (see FIGS. 4B, 5) and a reduced risk of unwanted ergonomic effects 102 (see FIG. 5). As used herein, "attenuation of vibration" means a reduction in the force of a vibration to a user who is using or operating the coated article 92a (see FIG. 5).

As shown in FIG. 5, the article 92 to be coated with the coating 60, for example, coated partially, substantially, or completely, may comprise an implement 104 to obtain a coated implement 104, or a tool 106 to obtain a coated tool 106a. As further shown in FIG. 5, the article 92 to be coated with the coating 60 may comprise a percussive tool 108 to obtain a coated percussive tool 108a, including a rivet gun 110 to obtain a coated rivet gun 110a. As further shown in FIG. 5, the article 92 to be coated with the coating 60 may comprise a bucking bar 112 to obtain a coated bucking bar 112a. The bucking bar 112 (FIGS. 5, 6F), may be used with a rivet gun 110 (FIGS. 5, 6F), and both the rivet gun 110 and the bucking bar 112 may be coated partially, substantially, or completely with the coating 60 (see FIGS. 5, 6F). A bucking bar is a solid block or bar typically made of steel, tungsten, or another high density heavy metal, that is used to back up a rivet while it is being installed and set.

As further shown in FIG. 5, the article 92 to be coated with the coating 60 may comprise a handle 114 to obtain a coated handle 114a, a glove 116 to obtain a coated glove 116, or another suitable article 92. As further shown in FIG. 5, the article 92 to be coated with the coating 60 may comprise other exemplary tools 106, such as hand-held tools 118 and automated robotic-held tools 120, as well as other exemplary percussive tools 108, such as power drills 122, hammer drills 124, power sanding devices 126, or other suitable percussive tools 108, for example, grinder devices, chiseling devices, punching devices, e.g., nail punch, and the like. In addition, the article 92 to be coated with the coating 60 may comprise audio equipment, such as amplifiers and speaker cabinets, and other structures and articles that produce vibrations when used.

As used herein, "percussive tool" means a power driven tool, for example, electric, pneumatic, hydraulic, or kinetic tools powered by electricity, compressed air, hydraulic fluid, or another suitable power source, and where the percussive tool operates by striking rapid blows against an object or surface, for example, a rivet gun.

In one preferred embodiment, the coating 60 (see FIG. 5), such as the coating 60a (see FIG. 5) with tungsten carbide 68a (see FIG. 5), is applied to a percussive tool 108 (see FIG. 5), such as a rivet gun 110 (see FIG. 5). The coating 60a (see FIG. 5) comprises the adhesive material 62 (see FIG. 5), in contact with at least one substrate 94 (see FIG. 5) of the percussive tool 108 (see FIG. 5). As shown in FIG. 5, the adhesive material 62 comprises a binder material 64 and comprises one or more of, a viscoelastic adhesive 62a, a mastic viscoelastic adhesive 62b, a hot-melt adhesive 62c, a spray adhesive 62d, a liquid adhesive 62e, an adhesive glue 62f, a pressure sensitive adhesive 62g, or another suitable adhesive material.

The coating 60a (see FIG. 5) further comprises a plurality of tungsten carbide pellets 66a (see FIG. 5) disposed in the adhesive material 62 (see FIG. 5). The plurality of tungsten carbide pellets 66a (see FIG. 5) is in an amount of at least 90% (ninety percent) by weight of the total weight percent of the coating 60a (see FIG. 5). Preferably, each tungsten carbide pellet 66a (see FIG. 5) has a diameter 76 (see FIG. 5) of at least 0.04 inch. More preferably, each tungsten carbide pellet 66a (see FIG. 5) has a diameter 76 (see FIG. 5) in a range of 0.04 inch to 0.10 inch.

Each tungsten carbide pellet 66a (see FIG. 5) has a shape 74 (see FIG. 5) or configuration. The shape 74 (see FIG. 5) may comprise a spherical shape 74a (see FIG. 5), a rod shape 74b (see FIG. 5), an elliptical shape 74c (see FIG. 5), a disk shape 74d (see FIG. 5), or another suitable shape.

The coating 60a (see FIG. 5) further comprises the polymer material 78 (see FIG. 5). The polymer material 78 (see FIG. 5) preferably comprises a cross-linked polyolefin heat shrink sleeve 84 (see FIG. 5), or another suitable polymer material.

The coating 60a (see FIG. 5) is applied to the at least one substrate 94 (see FIG. 5) of the percussive tool 108 (see FIG. 5), to obtain a mass-enhanced, coated percussive tool 108a (see FIG. 5). The coating 60a (see FIG. 5) is preferably applied to a barrel substrate 94a (see FIGS. 5, 6A) of the rivet gun 110 (see FIG. 5). Additionally, the coating 60a (see FIG. 5) may be applied to a handle substrate 94b (see FIGS. 5, 6A) of the rivet gun 110 (see FIGS. 5, 6A).

Preferably, the coating 60a (see FIG. 5) has a coating thickness 98 (see FIG. 5) of at least 0.25 inch. More preferably, the coating 60a (see FIG. 5) has a coating thickness 98 (see FIG. 5) in a range of 0.25 inch to 0.5 inch.

The coating thickness 98 (see FIG. 5) and the amount of tungsten carbide pellets 66a (see FIG. 5) in the coating 60a (see FIG. 5) are sufficient to provide an attenuation of vibration 100 (see FIG. 5) of the coated percussive tool 108a (see FIG. 5) and a reduced risk of unwanted ergonomic effects 102 (see FIG. 5).

The coating 60 (see FIG. 5) may also be in a form of a preformed coating cover 89 (see FIG. 5) that is configured to fit or form over and adhere to the substrate 94 (see FIG. 5) of the article 92 (see FIG. 5). The preformed coating cover 89 (see FIG. 5) comprises the adhesive material 62 (see FIG. 5) and the plurality of high density metal pellets 66 (see FIG. 5) disposed in the adhesive material 62 that form the metal adhesive matrix 70 (see FIG. 5), and further comprises the polymer material 78 (see FIG. 5) applied over or encasing the metal adhesive matrix 70 (see FIG. 5). The preformed coating cover 89 (see FIG. 5) may be cut or formed to a desired size to fit over the one or more substrates 94 (see FIG. 5) of the article 92 (see FIG. 5) to be covered. The first side 72a (see FIGS. 4A-4B) of the metal adhesive matrix 70 may be adhered to the substrate 94 (see FIG. 4B) of the article 92 (see FIG. 4B). Additional adhesive material 62 (see FIGS. 4A-4B, 5) may be applied onto the substrate 94 (see FIGS. 4B, 5) of the article 92 (see FIGS. 4B, 5) to sufficiently adhere the preformed coating cover 89 (see FIG. 5) to the substrate 94 (see FIG. 5).

Now referring to FIGS. 6A-6F, an article 92, in the form of a percussive tool 108, such as a rivet gun 110, is shown at various stages of being coated with the coating 60 of the disclosure to form a coated article 92a, in the form of a coated percussive tool 108a, such as a coated rivet gun 110a.

Now referring to FIG. 6A, FIG. 6A is an elevation view of a known article 92, in the form of a percussive tool 108, such as a rivet gun 110. As shown in FIG. 6A, the exemplary rivet gun 110 has a barrel portion 142 with a substrate 94, such as in the form of a barrel substrate 94a. The exemplary rivet gun 110 (see FIG. 6A) further has a spring element 143 (see FIG. 6A) attached at a rivet end 148 (see FIG. 6A). As shown in FIG. 6A, the exemplary rivet gun 110 further has a handle portion 144 with a substrate 94, such as in the form of a handle substrate 94b. The substrates 94 (see FIG. 6A) have substrate surfaces 95 (see FIG. 6A). The rivet gun 110 (see FIG. 6A) may also have one or more surfaces 134 that will not be coated with a coating 60 (see FIG. 4A, 5). As further shown in FIG. 6A, the handle portion 144 of the exemplary rivet gun 110 has a trigger 145 and a power connection end 146. The power connection end 146 (see FIG. 6) is configured for attachment to a power connection element 141 (see FIG. 6F), such as a power cord, which is, in turn, connected to a power source (not shown).

As further shown in FIG. 6A, a rivet die 147 may be attached to and removed from the rivet end 148 of the rivet gun 110. The end of the rivet die 147 (see FIG. 6A) is configured for contact with a head portion 29a (see FIG. 6F) of a fastener 28 (see FIG. 6F), such as in the form of a rivet 28a (see FIG. 6F), when riveting. The rivet die 147 (see FIG. 6A) is attached to and removable from an interior portion of the rivet gun 110 (see FIG. 6A), and different types of rivet dies may be changed out and used with a single rivet gun 110, depending on the type of rivet 28a (see FIG. 6F) used, the type of riveting being performed, and/or the desired type of rivet die needed. The rivet die 147 shown in FIG. 6A is merely representative of a rivet die, in general, and any number of different types of rivet die attachments may be used with the rivet gun 110. The rivet gun 110 (see FIG. 6A) may be powered electrically with electric power, pneumatically with compressed air, hydraulically with hydraulic fluid, or powered via another suitable power source.

FIG. 6B is an elevation view of the known article 92, in the form of the percussive tool 108, such as the rivet gun 110, of FIG. 6A, showing the substrate 94, such as the barrel substrate 94a, coated with a metal adhesive matrix 70 portion of the coating 60 (see FIGS. 4A-4B, 5) of the disclosure. As shown in FIG. 6B, the metal adhesive matrix 70 comprises the adhesive material 62 and the high density metal pellets 66. As shown in FIG. 6B, the rivet gun 110 is partially coated with the metal adhesive matrix 70, and the substrate 94, such as in the form of a handle substrate 94b, as well the surface 134, are uncoated.

FIG. 6C is an elevation view of a coated article 92a, in the form of a coated percussive tool 108a, such as a coated rivet gun 110a, where the substrate 94, such as the barrel substrate 94a, of the rivet gun 110 of FIG. 6B is now coated with an embodiment of the coating 60 of the disclosure. FIG. 6C shows the outer portion of the coating 60 comprising the polymer material 78, such as in the form of polymer material sleeve 82, that encases the inner portion of the coating 60 comprising the metal adhesive matrix 70 (see FIG. 6B). As shown in FIG. 6C, the coated rivet gun 110a is partially coated with the coating 60, and the substrate 94, such as in the form of a handle substrate 94b, and surface 134 are uncoated. The coating system 90 (see FIG. 6C) includes the coated article 92a (see FIG. 6C), in the form of a coated percussive tool 108a (see FIG. 6C), such as a coated rivet gun 110a (see FIG. 6C), coated with the coating 60 (see FIG. 6C).

FIG. 6D is a cross-sectional view taken along the lines 6D-6D of FIG. 6C. FIG. 6D shows the coating system 90 with the article 92 coated with the coating 60, to obtain the coated article 92a. As shown in FIG. 6D, the coating 60 applied to the substrate 94, such as the barrel substrate 94a, of the article 92, comprises the adhesive material 62 and the plurality of high density metal pellets 66 which form the metal adhesive matrix 70, shown as the inner portion of the coating 60. As further shown in FIG. 6D, the coating 60 comprises the polymer material 78, such as in the form of polymer material sleeve 82, that surrounds or encases the metal adhesive matrix 70, and shown as the outer portion of the coating 60.

Figure 6E:
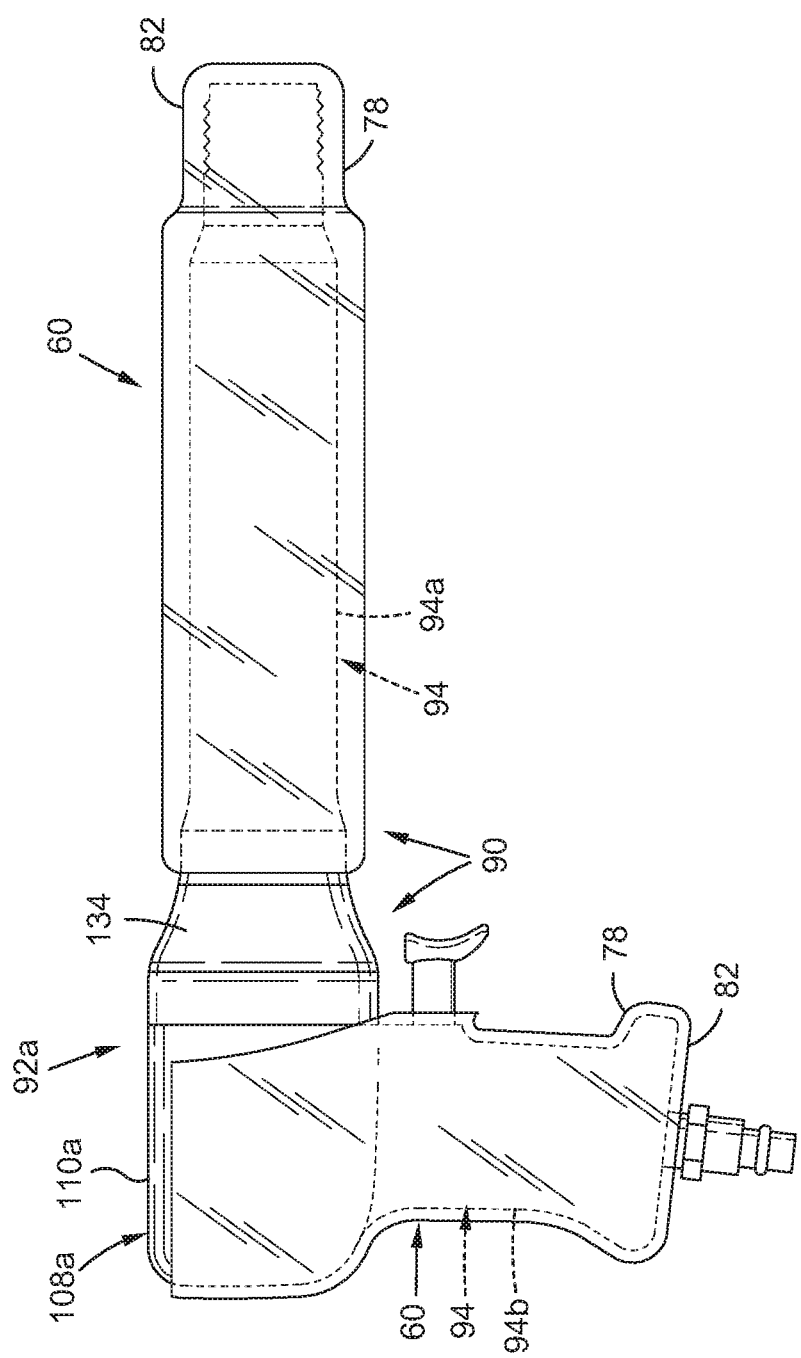
FIG. 6E is an elevation view of the coated article, in the form of the coated percussive tool, such as the coated rivet gun, of FIG. 6C, showing a handle substrate also coated with an embodiment of a coating of the disclosure.

FIG. 6E is an elevation view of the coated article 92a, in the form of the coated percussive tool 108a, such as the coated rivet gun 110a, of FIG. 6C, showing the substrate 94, such as in the form of barrel substrate 94a, coated with the coating 60, and also showing the substrate 94, such as in the form of handle substrate 94b, coated with the coating 60.

FIG. 6D further shows the outer portion of the coating 60 comprising the polymer material 78, such as in the form of polymer material sleeve 82, on both the barrel substrate 94a and the handle substrate 94b. As shown in FIG. 6E, the coated rivet gun 110a is substantially coated with the coating 60, as both the barrel substrate 94a and the handle substrate 94b are coated. Surface 134 (see FIG. 6E) is uncoated. The coating system 90 (see FIG. 6E) includes the coated article 92a (see FIG. 6E), in the form of the coated percussive tool 108a (see FIG. 6E), such as the coated rivet gun 110a (see FIG. 6E), coated with the coating 60 (see FIG. 6E).

Figure 6F:
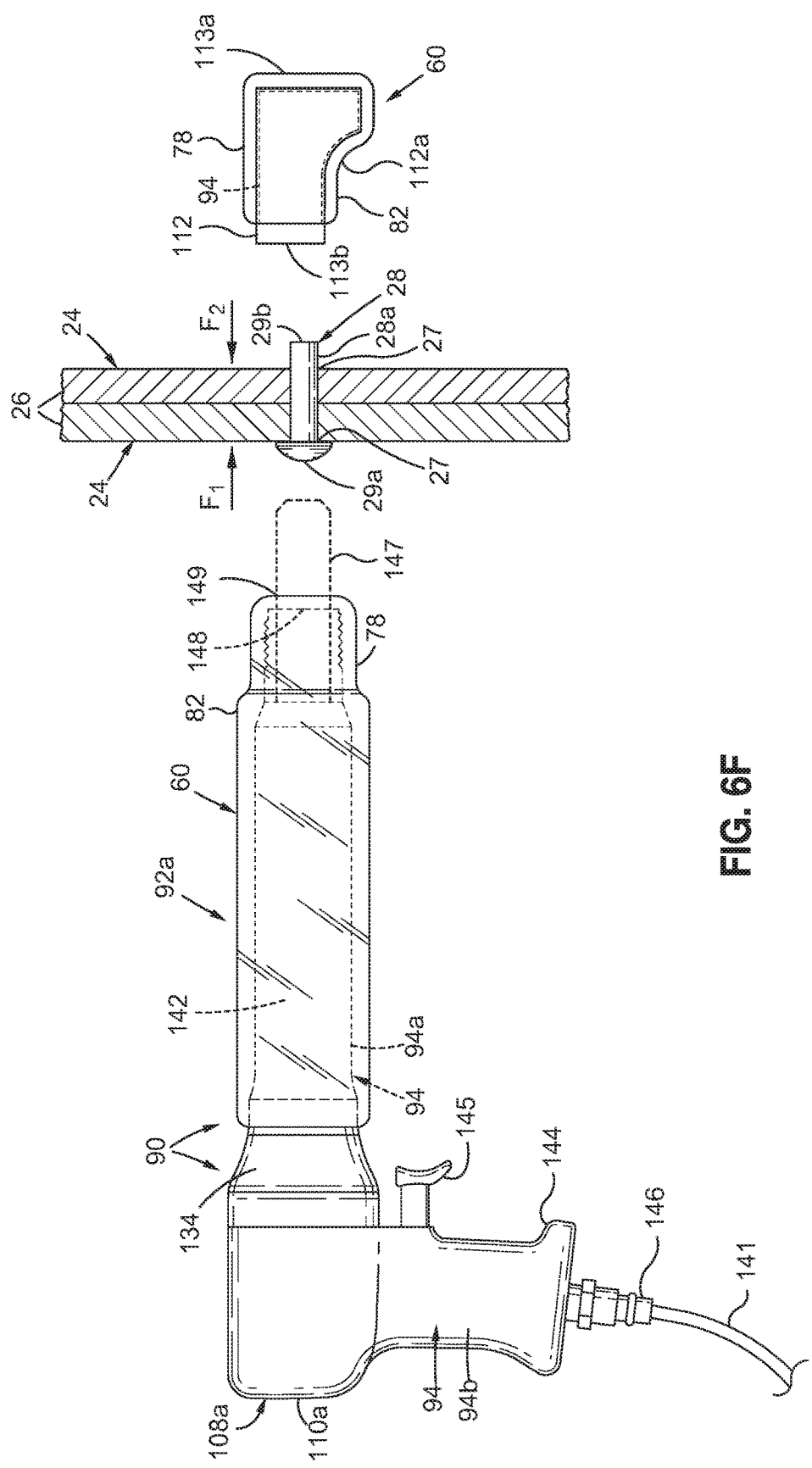
FIG. 6F is an elevation view of the coated article, in the form of the coated percussive tool, such as the coated rivet gun, of FIG. 6C, used with a coated bucking bar, to apply force to set a rivet to join two structures together.

FIG. 6F is an elevation view of the coated article 92a, in the form of the coated percussive tool 108a, such as the coated rivet gun 110a, of FIG. 6C, used with a coated bucking bar 112a, to apply force to set a fastener 28, such as in the form of a rivet 28a, to join two structures 24, such as wing panels 26, together. FIG. 6F shows the outer portion of the coating 60 comprising the polymer material 78, such as in the form of polymer material sleeve 82, that encases the inner portion of the coating 60 comprising the metal adhesive matrix 70 (see FIG. 6B). As shown in FIG. 6F, the coated rivet gun 110a is partially coated with the coating 60, and the substrate 94, such as in the form of barrel substrate 94a, of the barrel portion 142 is coated. As further shown in FIG. 6F, the substrate 94, such as in the form of handle substrate 94b, of the handle portion 144, as well as the surface 134 are uncoated. The coating system 90 (see FIG. 6F) includes the coated article 92a (see FIG. 6F), in the form of the coated percussive tool 108a (see FIG. 6F), such as the coated rivet gun 110a (see FIG. 6F), coated with the coating 60 (see FIG. 6F). FIG. 6F further shows the power connection element 141 attached to the power connection end 146 of the handle portion 144, and shows the trigger 145 of the handle 144. As further shown in FIG. 6F, an opening 149 or hole is preferably cut through the coating 60 at the rivet end 148 of the coated rivet gun 110a, so that the rivet die 147 may be attached to an interior portion of the coated rivet gun 110a.

As shown in FIG. 6F, the coated rivet gun 110a is used with a bucking bar 112 that has been coated with the coating 60, to obtain a coated bucking bar 112a. FIG. 6F shows the substrate 94 of the bucking bar 112 partially coated with the coating 60, and shows the outer portion of the coating 60 on the coated bucking bar 112a comprising the polymer material 78, such as in the form of polymer material sleeve 82. As further shown in FIG. 6F, a coated end 113a of the coated bucking bar 112a is configured to be held by a user (not shown) during riveting, and an uncoated end 113b of the bucking bar 112 is configured for contact with a tail portion 29b of the fastener 28, such as in the form of the rivet 28a, when riveting.

FIG. 6F shows the fastener 28, such as the rivet 28a, inserted through two structures 24, such as in the form of wing panels 26, to join the two structures 24 together by riveting the fastener 28, such as the rivet 28a, with the coated rivet gun 110a in front of the fastener 28 and the coated bucking bar 112a behind the fastener 28. As shown in FIG. 6F, the end of the rivet die 147 is configured to contact the head portion 29a of the fastener 28, such as the rivet 28a, and the rivet die 147 and the coated rivet gun 110a apply a force ($F_1$) to the head portion 29a of the fastener 28, such as the rivet 28a, to set the fastener 28, such as the rivet 28a, in the structures 24.

As further shown in FIG. 6F, the uncoated end 113b of the coated bucking bar 112a is configured to be held against the tail portion 29b of the fastener 28, such as the rivet 28a, when the rivet die 147 of the coated rivet gun 110a is riveting the fastener 28, such as the rivet 28a. The coated bucking bar 112a (see FIG. 6F) is designed to apply a reaction force ($F_2$) (see FIG. 6F) to the tail portion 29b (see FIG. 6F) of the fastener 28, such as the rivet 28a, in reaction to the force ($F_1$) (see FIG. 6F) applied by rivet die 147 (see FIG. 6F) and the coated rivet gun 110a (see FIG. 6F). During riveting and installation of the fastener 28, such as the rivet 28a, to join the structures 24, such as wing panels 26, together, the uncoated end 113b of the coated bucking bar 112a may be held against the tail portion 29b of the fastener 28, such as the rivet 28a, while the rivet die 147 (see FIG. 6F) of the coated rivet gun 110a applies force ($F_1$) (see FIG. 6F) to, or hammers away at, the head portion 29a (see FIG. 6F) of the fastener 28, such as the rivet 28a, causing the tail portion 29b (see FIG. 6F) to set. The fastener 28 (see FIG. 6F), such as the rivet 28a (see FIG. 6F), expands in openings 27 (see FIG. 6F) of structures 24 (see FIG. 6F), such as the wing panels 26 (see FIG. 6F), being held together, until the fastener 28, such as the rivet 28a, fills the space in the openings 27 (see FIG. 6F).

Figure 7:
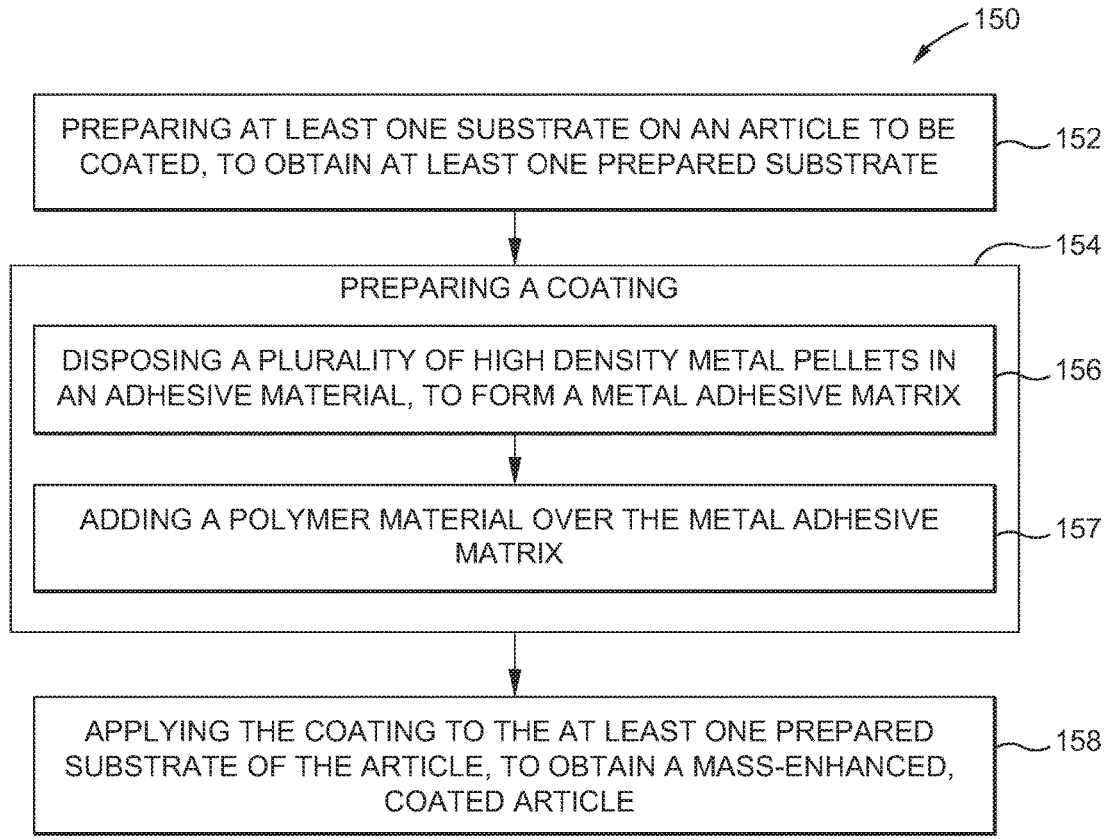
FIG. 7 is an illustration of a flow diagram of an exemplary embodiment of a method of the disclosure.

Now referring to FIG. 7, in another embodiment, there is provided a method 150 of making a coating 60 (see FIGS. 4A, 5) applied to an article 92 (see FIGS. 4B, 5, 6A). FIG. 7 is an illustration of a flow diagram of an exemplary embodiment of the method 150 of the disclosure.

As shown in FIG. 7, the method 150 comprises step 152 of preparing at least one substrate 94 (see FIGS. 4B, 5) on the article 92 (see FIGS. 4B, 5) to be coated, to obtain at least one prepared substrate 96 (see FIGS. 4B, 5). The step 152 of preparing the at least one substrate 94 comprises using a preparation process 128 (see FIG. 5) and one or more preparation agents 130 (see FIG. 5) to prepare the at least one substrate 94. The preparation process 128 may comprise one or more cleaning processes, such as hand cleaning, power tool cleaning, abrasive cleaning, or another suitable type of cleaning, may comprise polishing processes, may comprise smoothing processes, or may comprise another suitable preparation process 128 to prepare the substrate 94. The one or more preparation agents 130 may comprise one or more cleaning agents, such as water, detergent, soap, bleach, acidic cleaning solutions, degreasers, or another suitable cleaning agent, one or more polishing agents, one or more smoothing agents, or another suitable preparation agent 130.

The step 152 of preparing the at least one substrate 94 further comprises masking 132 (see FIG. 5) one or more surfaces 134 (see FIG. 5) of the article 92, where the surfaces 134 are not to be coated with the coating 60 (see FIGS. 4A, 5) during a particular coating process. The surfaces 134 (see FIGS. 5, 6C) may be masked via masking 132 (see FIG. 5) with a masking element, such as tape, or another suitable masking element.

As discussed in detail above, the article 92 preferably comprises one of, an implement 104, a tool 106, a percussive tool 108 including a rivet gun 110, a bucking bar 112, a handle 114, a glove 116, a hand-held tool 118, an automated robotic-held tool 120, a power drill 122, a hammer drill 124, a power sanding device 126, or another suitable article 92, as discussed above.

As shown in FIG. 7, the method 150 further comprises step 154 of preparing the coating 60 (see FIGS. 4A, 5). As further shown in FIG. 7, the coating 60 is obtained by step 156 of disposing a plurality of high density metal pellets 66 (see FIGS. 4A, 5, 6B) in an adhesive material 62 (see FIGS. 4A, 5, 6B), to form a metal adhesive matrix 70 (see FIGS. 4A, 5, 6B), and by step 157 of adding a polymer material 78 (see FIGS. 4A, 5, 6C) over the metal adhesive matrix 70.

As discussed in detail above, the plurality of high density metal pellets 66 is preferably in an amount of at least 90% (ninety percent) by weight of the total weight percent of the coating 60. Each high density metal pellet 66 (see FIG. 5) has a diameter 76 (see FIG. 5) of at least 0.04 inch.

The step 154 (see FIG. 7) of preparing the coating 60 (see FIGS. 4A, 5) further comprises disposing the plurality of high density metal pellets 66 with each high density metal pellet 66 (see FIG. 5) comprising a high density metal material 68 (see FIG. 5) comprising one or more of, tungsten carbide 68a (see FIG. 5), tungsten 68b (see FIG. 5), iron 68c (see FIG. 5), copper 68d (see FIG. 5), nickel 68e (see FIG. 5), lead 68f (see FIG. 5), molybdenum 68g (see FIG. 5), steel 68h (see FIG. 5), inconel 68i (see FIG. 5), platinum 68j (see FIG. 5), tin 68k (see FIG. 5), silver 68l (see FIG. 5), zinc 68m (see FIG. 5), bronze 68n (see FIG. 5), and alloys 68o (see FIG. 5) of one or more of the high density metal materials 68 thereof, or another suitable high density metal material 68.

The step 154 (see FIG. 7) of preparing the coating 60 (see FIGS. 4A, 5) further comprises disposing the plurality of high density metal pellets 66 in the adhesive material 62 comprising a binder material 64 (see FIG. 5), and comprising, as shown in FIG. 5, one or more of, a viscoelastic adhesive 62a, a mastic viscoelastic adhesive 62b, a hot-melt adhesive 62c, a spray adhesive 62d, a liquid adhesive 62e, an adhesive glue 62f, and a pressure sensitive adhesive 62g.

The step 154 (see FIG. 7) of preparing the coating 60 (see FIGS. 4A, 5) further comprises step 157 (see FIG. 7) of adding the polymer material 78 (see FIGS. 4A, 5, 6C) comprising a polymer material 78 comprised of one of, or one or more of, polyolefin 80a (see FIG. 5), polyethylene (PE) 80b (see FIG. 5), polypropylene (PP) 80c (see FIG. 5), nylon 80d (see FIG. 5), polytetrafluoroethylene (PTFE) 80e, (see FIG. 5) fluorinated ethylene propylene (FEP) 80f (see FIG. 5), perfluoroalkoxy alkanes (PFA) 80g (see FIG. 5), ethylene tetrafluoroethylene (ETFE) 80h (see FIG. 5), polyester 80i (see FIG. 5), polyether ether ketone (PEEK) 80j (see FIG. 5), polyvinyl chloride (PVC) 80k (see FIG. 5), polyimide (PI) 80l (see FIG. 5), polyamide 80m (see FIG. 5), polyurethane (PU) 80n (see FIG. 5), polystyrene (PS) 80o (see FIG. 5), polyvinylidene fluoride (PVDF) 80p (see FIG. 5), polyvinyl acetate (PVAC) 80q (see FIG. 5), or another suitable polymer. More preferably, the polymer material 78 (see FIG. 5) is formed of the polymer 80 (see FIG. 5) comprising polyolefin 80a (see FIG. 5).

The step 154 (see FIG. 7) of preparing the coating 60 (see FIGS. 4A, 5) further comprises step 157 (see FIG. 7) of adding the polymer material 78 (see FIGS. 4A, 5, 6C) preferably in the form of a polymer material sleeve 82 (see FIGS. 5, 6C). More preferably, the polymer material 78 (see FIG. 5) is in the form of a polymer material heat shrink sleeve 83 (see FIG. 5). Most preferably, the polymer material 78 (see FIG. 5) is in the form of a cross-linked polyolefin heat shrink sleeve 84 (see FIG. 5).

As shown in FIG. 7, the method 150 further comprises step 158 of applying the coating 60 (see FIGS. 4B, 5) to the at least one prepared substrate 96 of the article 92, to obtain a mass-enhanced, coated article 92a (see FIGS. 4B, 5, 6C). Preferably, the coating 60 (see FIGS. 4B, 5) has a coating thickness 98 (see FIG. 5) of at least 0.25 inch. More preferably, the coating has a coating thickness 98 (see FIG. 5) in a range of 0.25 inch to 0.5 inch. The coating thickness 98 and the amount of high density metal pellets 66 are sufficient to provide an attenuation of vibration 100 (see FIG. 5) of the coated article 92a (see FIG. 5) and a reduced risk of unwanted ergonomic effects 102 (see FIG. 5).

The step 158 (see FIG. 7) of applying the coating 60 (see FIGS. 4B, 5) preferably further comprises contacting the at least one prepared substrate 96 with the adhesive material 62 and heating the adhesive material 62 to a desired viscosity 136 (see FIG. 5). The step 158 (see FIG. 7) of applying the coating 60 (see FIGS. 4B, 5) preferably further comprises adhering the plurality of high density metal pellets 66 to the adhesive material 62, and repeating sequentially, all of the contacting, the heating, and the adhering steps, a desired number of times, until a desired thickness 73 (see FIG. 5) of the metal adhesive matrix 70 is obtained. The step 158 (see FIG. 7) of applying the coating 60 (see FIGS. 4B, 5) preferably further comprises molding the metal adhesive matrix 70 to obtain a desired shape 138 (see FIG. 5) and a desired smoothness 140 (see FIG. 5), and applying or adding the polymer material 78 over the metal adhesive matrix 70.

Figure 8:
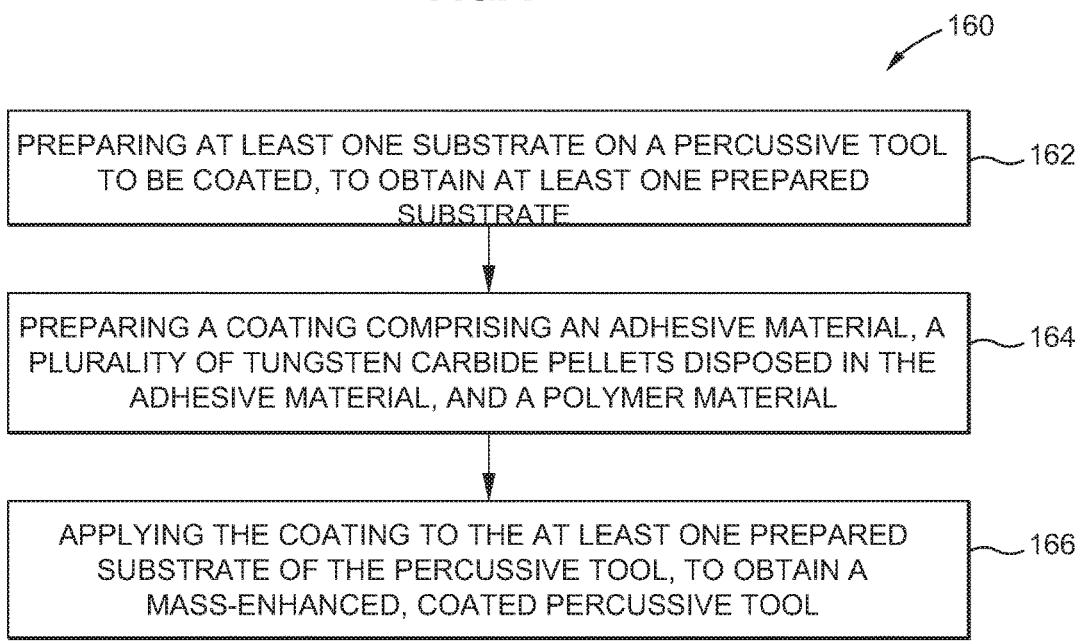
FIG. 8 is an illustration of a flow diagram of another exemplary embodiment of a method of the disclosure.

Now referring to FIG. 8, in another embodiment, there is provided a method 160 of making a coated percussive tool 108a (see FIGS. 5, 6C). FIG. 8 is an illustration of a flow diagram of another exemplary embodiment of the method 160 of the disclosure.

As shown in FIG. 8, the method 160 comprises step 162 of preparing at least one substrate 94 on a percussive tool 108 to be coated, to obtain at least one prepared substrate 96. The percussive tool 108 (see FIGS. 5, 6A) preferably comprises a rivet gun 110 (see FIGS. 5, 6A). As discussed above, the step 162 of preparing the at least one substrate 94 comprises using a preparation process 128 (see FIG. 5) and one or more preparation agents 130 (see FIG. 5) to prepare the at least one substrate 94. The preparation process 128 may comprise one or more cleaning processes, such as hand cleaning, power tool cleaning, abrasive cleaning, or another suitable type of cleaning, may comprise polishing processes, may comprise smoothing processes, or may comprise another suitable preparation process 128 to prepare the substrate 94. The one or more preparation agents 130 may comprise one or more cleaning agents, such as water, detergent, soap, bleach, acidic cleaning solutions, degreasers, or another suitable cleaning agent, one or more polishing agents, one or more smoothing agents, or another suitable preparation agent 130.

The step 162 of preparing the at least one substrate 94 further comprises masking 132 (see FIG. 5) one or more surfaces 134 (see FIG. 5) of the percussive tool 108, where the surfaces 134 are not to be coated with the coating 60 (see FIGS. 4A, 5) during a particular coating process. The surfaces 134 (see FIG. 5) may be masked via masking 132 (see FIG. 5) with a masking element, such as tape, or another suitable masking element.

As shown in FIG. 8, the method 160 further comprises step 164 of preparing a coating 60a. The coating 60s, as discussed in further detail above, comprises an adhesive material 62. As shown in FIG. 5, the adhesive material 62 comprises a binder material 64 and comprises one or more of, a viscoelastic adhesive 62a, a mastic viscoelastic adhesive 62b, a hot-melt adhesive 62c, a spray adhesive 62d, a liquid adhesive 62e, an adhesive glue 62f, and a pressure sensitive adhesive 62g.

The coating 60a further comprises a plurality of tungsten carbide pellets 66a disposed in the adhesive material 62, to form a metal adhesive matrix 70. As discussed in detail above, the plurality of tungsten carbide pellets 66a is in an amount of at least 90% (ninety percent) by weight of the total weight percent of the coating 60a. Each tungsten carbide pellet 66a has a diameter 76 of at least 0.04 inch. More preferably, each tungsten carbide pellet 66a has a diameter 76 in a range of 0.04 inch to 0.1 inch.

Each high density metal pellet 66 has a shape 74 (see FIG. 5). The shape 74 (see FIG. 5) may comprise a spherical shape 74a (see FIG. 5), a rod shape 74b (see FIG. 5), an elliptical shape 74c (see FIG. 5), a disk shape 74d (see FIG. 5), or another suitable shape.

The coating 60a further comprises a polymer material 78. As discussed in detail above, the polymer material 78 is formed of one or more polymers 80 (see FIGS. 4A, 5) comprising one or more of, polyolefin 80a (see FIG. 5), polyethylene (PE) 80b (see FIG. 5), polypropylene (PP) 80c (see FIG. 5), nylon 80d (see FIG. 5), polytetrafluoroethylene (PTFE) 80e, (see FIG. 5) fluorinated ethylene propylene (FEP) 80f (see FIG. 5), perfluoroalkoxy alkanes (PFA) 80g (see FIG. 5), ethylene tetrafluoroethylene (ETFE) 80h (see FIG. 5), polyester 80i (see FIG. 5), polyether ketone (PEEK) 80j (see FIG. 5), polyvinyl chloride (PVC) 80k (see FIG. 5), polyimide (PI) 80l (see FIG. 5), polyamide 80m (see FIG. 5), polyurethane (PU) 80n (see FIG. 5), polystyrene (PS) 80o (see FIG. 5), polyvinylidene fluoride (PVDF) 80p (see FIG. 5), polyvinyl acetate (PVAC) 80q (see FIG. 5), or another suitable polymer. More preferably, the polymer material 78 (see FIG. 5) is formed of the polymer 80 (see FIG. 5) comprising polyolefin 80a (see FIG. 5).

The polymer material 78 (see FIGS. 4A, 5) is preferably in the form of a polymer material sleeve 82 (see FIGS. 5, 6C). More preferably, the polymer material 78 (see FIG. 5) is in the form of a polymer material heat shrink sleeve 83 (see FIG. 5). Most preferably, the polymer material 78 (see FIG. 5) is in the form of a cross-linked polyolefin heat shrink sleeve 84 (see FIG. 5).

As shown in FIG. 8, the method 160 further comprises step 166 of applying the coating 60a to the at least one prepared substrate 94 of the percussive tool 108, to obtain a mass-enhanced, coated percussive tool 108a. Preferably, the coating 60a (see FIG. 5) has a coating thickness 98 (see FIG. 5) of at least 0.25 inch. More preferably, the coating 60a (see FIG. 5) has a coating thickness 98 (see FIG. 5) in a range of 0.25 inch to 0.5 inch.

The coating thickness 98 (see FIG. 5) and the amount of tungsten carbide pellets 66a (see FIG. 5) are sufficient to provide an attenuation of vibration 100 (see FIG. 5) of the coated article 92a and a reduced risk of unwanted ergonomic effects 102 (see FIG. 5).

The step 166 of applying the coating 60a comprises applying the coating 60a to a barrel substrate 94a of the percussive tool 108, such as the rivet gun 110. The step 166 of applying the coating 60a may further comprise applying the coating 60a to a handle substrate 94b (see FIG. 5) of the rivet gun 110.

The step 166 (see FIG. 7) of applying the coating 60a preferably further comprises contacting the at least one prepared substrate 96 with the adhesive material 62 and heating the adhesive material 62 to a desired viscosity 136 (see FIG. 5). The step 166 (see FIG. 7) of applying the coating 60a preferably further comprises adhering the plurality of tungsten carbide pellets 66a to the adhesive material 62, and repeating sequentially, all of the contacting, the heating, and the adhering steps, a desired number of times, until a desired thickness 73 (see FIG. 5) of the metal adhesive matrix 70 is obtained. The step 166 (see FIG. 7) of applying the coating 60a preferably further comprises molding the metal adhesive matrix 70 to obtain a desired shape 138 (see FIG. 5) and a desired smoothness 140 (see FIG. 5), and applying the polymer material 78 over the metal adhesive matrix 70.

Figure 9:
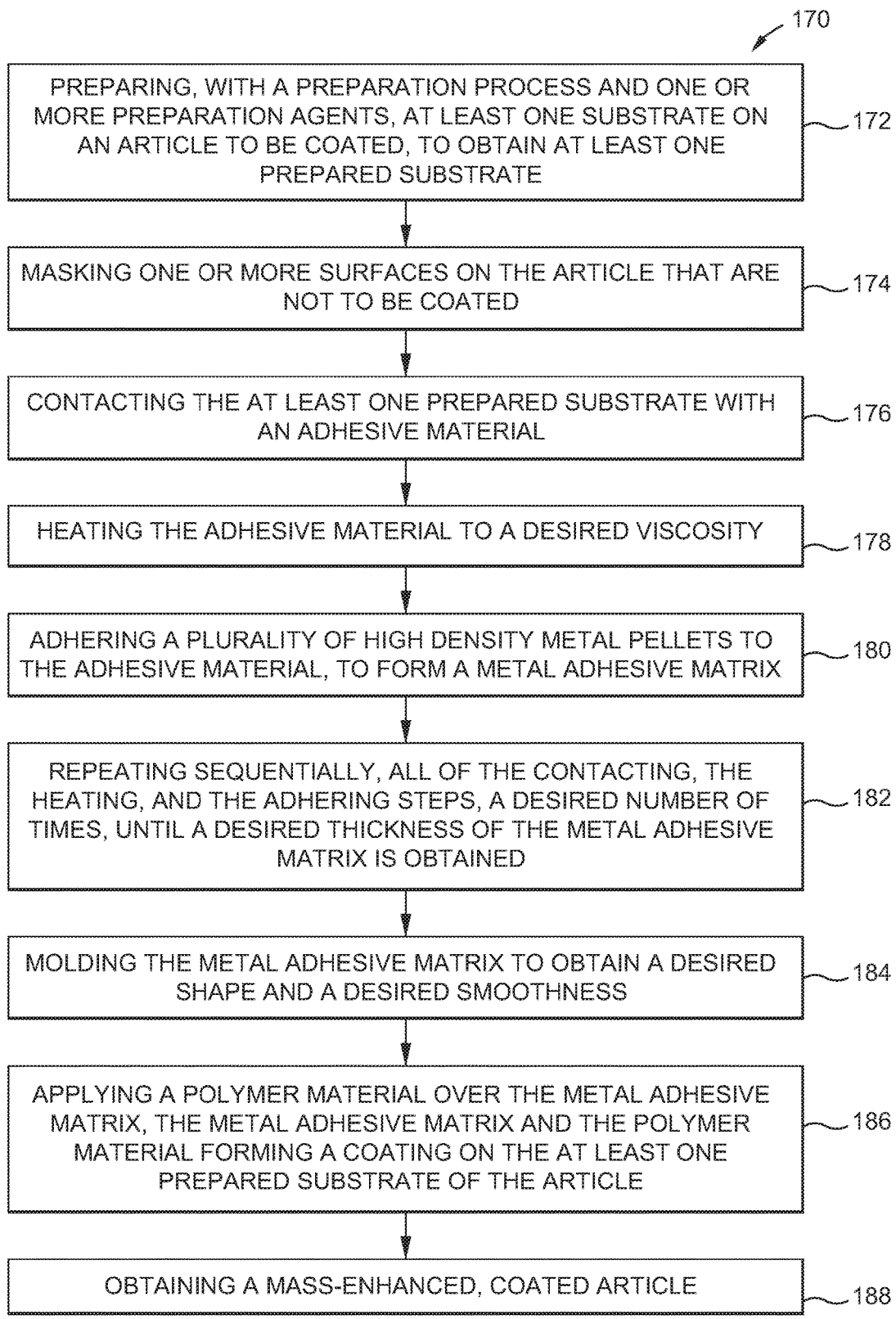
FIG. 9 is an illustration of a flow diagram of yet another exemplary embodiment of a method of the disclosure.

Now referring to FIG. 9, in another embodiment, there is provided a method 170 of coating an article 92 (FIGS. 4B, 5, 6A). FIG. 9 is an illustration of a flow diagram of yet another exemplary embodiment of the method 170 of the disclosure. As discussed in detail above, the article 92, as shown in FIG. 5, preferably comprises one of, an implement 104, a tool 106, a percussive tool 108 including a rivet gun 110, a bucking bar 112, a handle 114, a glove 116, a hand-held tool 118, an automated robotic-held tool 120, a power drill 122, a hammer drill 124, a power sanding device 126, or another suitable article 92, as discussed above.

As shown in FIG. 9, the method 170 comprises step 172 of preparing, with a preparation process 128 (see FIG. 5) and one or more preparation agents 128 (see FIG. 5), at least one substrate 94 (see FIG. 5) on the article 92 (see FIG. 5) to be coated, to obtain at least one prepared substrate 96 (see FIG. 5). The step 172 of preparing the at least one substrate 94 comprises using a preparation process 128 (see FIG. 5) and one or more preparation agents 130 (see FIG. 5) to prepare the at least one substrate 94. The preparation process 128 may comprise one or more cleaning processes, such as hand cleaning, power tool cleaning, abrasive cleaning, or another suitable type of cleaning, may comprise polishing processes, may comprise smoothing processes, or may comprise another suitable preparation process 128 to prepare the substrate 94. The one or more preparation agents 130 may comprise one or more cleaning agents, such as solvents, water, detergent, soap, bleach, acidic cleaning solutions, degreasers, or another suitable cleaning agent, one or more polishing agents, one or more smoothing agents, or another suitable preparation agent 130. For example, one or more desired locations on the article 92 (see FIG. 5), such as at least one substrate 94 (see FIG. 5), including a barrel substrate 94a (see FIG. 6A), of a barrel portion 142 of a percussive tool 108 (see FIG. 6A), such as a rivet gun 110 (see FIG. 6A), may be prepared by cleaning with the preparation agent 130 (see FIG. 5), such as a solvent.

As shown in FIG. 9, the method 170 further comprises step 174 of masking 132 (see FIG. 5) one or more surfaces 134 (see FIG. 5) of the article 92 (see FIG. 5), where the surfaces 134 are not to be coated. The step 174 of masking 132 (see FIG. 5) one or more surfaces 134 (see FIG. 5) of the article 92, is preferably performed where the surfaces 134 (see FIGS. 5, 6C) are not to be coated with the coating 60 during a particular coating process. The surfaces 134 (see FIG. 5) may be masked via masking 132 (see FIG. 5) with a masking element, such as tape, or another suitable masking element. For example, one or more desired locations on the article 92 (see FIGS. 5, 6A), such as a surface 134 (see FIGS. 5, 6C), of a percussive tool 108 (see FIG. 6A), such as a rivet gun 110 (see FIG. 6A), may be masked off via masking 132 with tape. Preferably, all surfaces 134 (see FIG. 5) except the at least one substrate 94 (see FIG. 5) to be coated with the coating 60 (see FIGS. 4A, 5) may be masked.

As shown in FIG. 9, the method 170 further comprises step 176 of contacting the at least one prepared substrate 96 with an adhesive material 62. The step 176 of contacting the at least one prepared substrate 96 with the adhesive material 62 comprises contacting the at least one prepared substrate 96 with the adhesive material 62 comprising a binder material 64 and, as shown in FIG. 5, comprising one or more of, a viscoelastic adhesive 62a, a mastic viscoelastic adhesive 62b, a hot-melt adhesive 62c, a spray adhesive 62d, a liquid adhesive 62e, an adhesive glue 62f, and a pressure sensitive adhesive 62g. For example, the adhesive material 62 (see FIG. 5) may comprise a spray adhesive 62d (see FIG. 5), such as SUPER 77 spray adhesive obtained from 3M Company of St. Paul, Minn. (SUPER 77 is a registered trademark of 3M Company of St. Paul, Minn.) A medium wet coat of SUPER 77 spray adhesive may be sprayed evenly around the prepared substrate 96 (see FIGS. 4B, 5), such as the barrel 142 (see FIG. 6A) that has been cleaned, of the article 92 (see FIG. 6A), such as the percussive tool 108 (see FIG. 6A), for example, the rivet gun 110 (see FIG. 6A).

As shown in FIG. 9, the method 170 further comprises step 178 of heating the adhesive material 62 to a desired viscosity 136 (see FIG. 5). Heat may be applied to the adhesive material 62 with a heating element, such as a heat gun or another suitable heating element. The adhesive material 62, such as adhesive glue 62*f* (see FIG. 5), may be heated, so that it is still a firm consistency yet sufficiently viscous to hold a plurality of high density metal pellets 66 (see FIGS. 4B, 5, 6B). The adhesive material 62 may be heated to accelerate the method 170 and to obtain a desired viscosity 136 (see FIG. 5) of the adhesive material 62. The adhesive material 62 (see FIGS. 4B, 5) is preferably heated to a temperature, such as a temperature in a range of 150° F. (degrees Fahrenheit) to 350° F., to achieve a desired viscosity 136 (see FIG. 5).

As shown in FIG. 9, the method 170 further comprises step 180 of adhering a plurality of high density metal pellets 66 to the adhesive material 62, to form a metal adhesive matrix 70. For example, the high density metal pellets 66, such as high density metal pellets 66, such as tungsten carbide pellets 66*a*, may be sprinkled or disposed into the adhesive material 62 to evenly coat the substrate 94, such as the prepared substrate 96 (see FIG. 5), for example, the barrel substrate 94*a* (see FIG. 5) The uncoated side of the high density metal pellets 66, such as tungsten carbide pellets 66*a*, may be pressed into the adhesive material 62 (see FIG. 5), for example, manually with a gloved hand, to maximize the adhesion.

As discussed in detail above, the plurality of high density metal pellets 66 (see FIGS. 4B, 5, 6B) is preferably in an amount of at least 90% (ninety percent) by weight of the total weight percent of the coating 60 (see FIGS. 4B, 5). Each high density metal pellet 66 has a diameter 76 (see FIG. 5) of at least 0.04 inch. Each high density metal pellet 66 comprises a high density metal material 68 comprising one or more of, tungsten carbide 68*a* (see FIG. 5), tungsten 68*b* (see FIG. 5), iron 68*c* (see FIG. 5), copper 68*d* (see FIG. 5), nickel 68*e* (see FIG. 5), lead 68*f* (see FIG. 5), molybdenum 68*g* (see FIG. 5), steel 68*h* (see FIG. 5), inconel 68*i* (see FIG. 5), platinum 68*j* (see FIG. 5), tin 68*k* (see FIG. 5), silver 68*l* (see FIG. 5), zinc 68*m* (see FIG. 5), bronze 68*n* (see FIG. 5), and alloys 68*o* (see FIG. 5) of one or more of the high density metal materials 68 thereof.

As shown in FIG. 9, the method 170 further comprises step 182 of repeating sequentially, all of each of the contacting step 176, the heating step 178, and the adhering step 180, a desired number of times, until a desired thickness 73 (see FIG. 5) of the metal adhesive matrix 70 (see FIG. 5) is obtained. For example, the contacting step 176 (see FIG. 9), the heating step 178 (see FIG. 9), and the adhering step 180 (see FIG. 9), may each be repeated sequentially, for example three (3) or four (4), or more times, until three (3) or four (4) coats or layers, or a desired number of coats or layers, of the adhesive material 62 (see FIGS. 5, 6B) and the high density metal pellets 66 (see FIGS. 5, 6B), such as tungsten carbide pellets 66*a* (see FIG. 5), have been applied or achieved, to obtain the metal adhesive layer 70 (see FIGS. 5, 6B), such as the metal adhesive layer 70*a* (see FIG. 5) with tungsten carbide.

As shown in FIG. 9, the method 170 further comprises step 184 of molding the metal adhesive matrix 70 to obtain a desired shape 138 (see FIG. 5) and a desired smoothness 140 (see FIG. 5). For example, the partially coated substrate 94, such as the barrel substrate 94*a* (see FIGS. 5, 6B), coated with the metal adhesive matrix 70 (see FIGS. 5, 6B), may be rolled on a smooth flat surface to form the metal adhesive matrix 70 into a desired shape 138 (see FIG. 5), such as a rounded shape, and to achieve a desired smoothness 140 (see FIG. 5), such as a consistent smoothness. Step 184 of molding the metal adhesive matrix 70 (see FIGS. 5, 6B) may be repeated again until a desired diameter and weight of the metal adhesive matrix 70 on the substrate 94, such as the barrel substrate 94*a* (see FIGS. 5, 6B) is achieved. For example, a total of five (5) to seven (7) coats or layers of the adhesive material 62 (see FIGS. 5, 6B) and the high density metal pellets 66 (see FIGS. 5, 6B), such as tungsten carbide pellets 66*a* (see FIG. 5), may be formed. The metal adhesive matrix 70 may be rolled again to make a smooth round cylinder around the substrate 94, such as the barrel substrate 94*a* (see FIGS. 5, 6B), of the percussive tool 108 (see FIGS. 5, 6B), such as the rivet gun 110 (see FIGS. 5, 6B), one final time.

The step 184 (see FIG. 9) of molding the metal adhesive matrix 70 to obtain the desired shape 138 (see FIG. 5) and the desired smoothness 140 (see FIG. 5) may comprise further rolling the partially coated substrate 94 coated with the formed metal adhesive matrix 70 on a flat surface and cutting with a cutting apparatus, such as a long bladed razor or another suitable cutting apparatus, a clean edge on the formed metal adhesive matrix 70 at both ends, leaving a bolt of adhered metal adhesive matrix 70 to the desired length of the substrate 94, such as the barrel substrate 94*a* (see FIGS. 5, 6B), of the percussive tool 108 (see FIGS. 5, 6B), such as the rivet gun 110 (see FIGS. 5, 6B). Any excess high density metal pellets 66 (see FIGS. 5, 6B), such as tungsten carbide pellets 66*a* (see FIG. 5), may be cleaned off or removed.

As shown in FIG. 9, the method 170 further comprises step 186 of applying the polymer material 78 (see FIGS. 5, 6C) over the metal adhesive matrix 70 (see FIGS. 5, 6B). The metal adhesive matrix 70 and the polymer material 78 form a coating 60 (see FIGS. 5, 6C) on the at least one prepared substrate 96 (see FIG. 5) of the article 92 (see FIG. 5).

As discussed in detail above, the polymer material 78 (see FIGS. 4A, 5, 6C) is formed of one or more polymers 80 (see FIGS. 4A, 5) comprising one or more of, polyolefin 80*a* (see FIG. 5), polyethylene (PE) 80*b* (see FIG. 5), polypropylene (PP) 80*c* (see FIG. 5), nylon 80*d* (see FIG. 5), polytetrafluoroethylene (PTFE) 80*e*, (see FIG. 5) fluorinated ethylene propylene (FEP) 80*f* (see FIG. 5), perfluoroalkoxy alkanes (PFA) 80*g* (see FIG. 5), ethylene tetrafluoroethylene (ETFE) 80*h* (see FIG. 5), polyester 80*i* (see FIG. 5), polyether ether ketone (PEEK) 80*j* (see FIG. 5), polyvinyl chloride (PVC) 80*k* (see FIG. 5), polyimide (PI) 80*l* (see FIG. 5), polyamide 80*m* (see FIG. 5), polyurethane (PU) 80*n* (see FIG. 5), polystyrene (PS) 80*o* (see FIG. 5), polyvinylidene fluoride (PVDF) 80*p* (see FIG. 5), polyvinyl acetate (PVAC) 80*q* (see FIG. 5), or another suitable polymer. More preferably, the polymer material 78 (see FIG. 5) is formed of the polymer 80 (see FIG. 5) comprising polyolefin 80*a* (see FIG. 5).

The polymer material 78 (see FIGS. 4A, 5) is preferably in the form of a polymer material sleeve 82 (see FIGS. 5, 6C). More preferably, the polymer material 78 (see FIG. 5) is in the form of a polymer material heat shrink sleeve 83 (see FIG. 5). Most preferably, the polymer material 78 (see FIG. 5) is in the form of a cross-linked polyolefin heat shrink sleeve 84 (see FIG. 5). Preferably, the coating 60 (see FIG. 4A) has an amount of polymer material 78 (see FIG. 4A) in an amount comprising 1.0% (one percent) by weight to 5.0% (five percent) by weight of the total weight percent of the coating 60.

The polymer material 78 (see FIGS. 4A, 5, 6C), such as the polymer material sleeve 82 (see FIGS. 5, 6C), including the cross-linked polyolefin heat shrink sleeve 84 (see FIG. 5), may be masked via masking 132 (see FIG. 5) with a masking element, such as tape, for ease of adding the polymer material 78 (see FIGS. 5, 6C), for example, sliding the cross-linked polyolefin heat shrink sleeve 84 (see FIG. 5), over and around the completed and formed metal adhesive matrix 70 (see FIGS. 5, 6B), and to prevent disturbing the soft adhered or glued high density metal pellets 66 (see FIGS. 5, 6B), such as tungsten carbide pellets 66*a* (see FIG. 5). The masked polymer material sleeve 82 (see FIGS. 5, 6C), such as the cross-linked polyolefin heat shrink sleeve 84 (see FIG. 5), may be quickly and lightly wetted with a solvent, such as isopropyl alcohol, so that the masked polymer material sleeve 82 (see FIGS. 5, 6C), such as the cross-linked polyolefin heat shrink sleeve 84 (see FIG. 5), may slide freely over and around the completed and formed metal adhesive matrix 70 (see FIGS. 5, 6B), and not disturb the metal adhesive matrix 70 (see FIGS. 5, 6B) (only if it is a tight fit). Then quickly, yet carefully, slide the masked polymer material sleeve 82 (see FIGS. 5, 6C), such as the cross-linked polyolefin heat shrink sleeve 84 (see FIG. 5), over and around the completed and formed metal adhesive matrix 70 (see FIGS. 5, 6B), thus applying the outer layer of the coating 60 (see FIGS. 5, 6C) comprising the polymer material 78 (see FIGS. 5, 6C), such as the polymer material sleeve 82 (see FIGS. 5, 6C), for example, the cross-linked polyolefin heat shrink sleeve 84 (see FIG. 5), to encase the metal adhesive matrix 70 (see FIGS. 5, 6B).

The applied polymer material sleeve 82 (see FIGS. 5, 6C), such as the cross-linked polyolefin heat shrink sleeve 84 (see FIG. 5), may be heated at the handle portion 144 (see FIG. 6A) side of the coated percussive tool 108*a* (see FIGS. 5, 6C), such as the coated rivet gun 110*a* (see FIGS. 5, 6C), to obtain a good and sufficient bond around the barrel portion 142 (see FIG. 6C) and the metal adhesive matrix 70 (see FIGS. 5, 6B), and then may be cooled for a sufficient time, for example, 2-5 minutes, before proceeding.

One end of the applied polymer material sleeve 82 (see FIGS. 5, 6C), such as the cross-linked polyolefin heat shrink sleeve 84 (see FIG. 5), may be held by the excess material at the rivet end 148 (see FIG. 6A) side of the coated percussive tool 108*a* (see FIGS. 5, 6C), such as the coated rivet gun 110*a* (see FIGS. 5, 6C), and the coated percussive tool 108*a* (see FIGS. 5, 6C), such as the coated rivet gun 110*a* (see FIGS. 5, 6C) may be suspended by hand or tool and heated consistently around the applied polymer material sleeve 82 (see FIGS. 5, 6C), such as the cross-linked polyolefin heat shrink sleeve 84 (see FIG. 5), from the handle portion 144 (see FIG. 6A) side. Slowly work a circular pattern back and forth to stretch the applied polymer material sleeve 82 (see FIGS. 5, 6C), such as the cross-linked polyolefin heat shrink sleeve 84 (see FIG. 5), as it shrinks, until the entire metal adhesive matrix 70 (see FIGS. 5, 6B) is coated and sealed with a little excess for trimming later. Any excess applied polymer material sleeve 82 (see FIGS. 5, 6C), such as the cross-linked polyolefin heat shrink sleeve 84 (see FIG. 5), may be trimmed with a cutting element, such as a long razor blade or other suitable cutting element, by rolling the coated percussive tool 108*a* (see FIGS. 5, 6C), such as the coated rivet gun 110*a* (see FIGS. 5, 6C), on a flat surface, while cutting a line around the coating 60 (see FIGS. 5, 6C), and removing any excess applied polymer material sleeve 82 (see FIGS. 5, 6C), such as the cross-linked polyolefin heat shrink sleeve 84 (see FIG. 5). The applied coating 60 and the coated percussive tool 108*a* (see FIGS. 5, 6C), such as the coated rivet gun 110*a* (see FIGS. 5, 6C), may then be cleaned with a solvent, such as isopropyl alcohol, to remove any adhesive material 62 (see FIG. 5), such as adhesive glue 62*f* (see FIG. 5), residue. If necessary, check for an obstructed exhaust port on the coated percussive tool 108*a* (see FIGS. 5, 6C), such as the coated rivet gun 110*a* (see FIGS. 5, 6C), and trim, if needed.

As shown in FIG. 9, the method 170 further comprises step 188 of obtaining a mass-enhanced, coated article 92*a* (see FIG. 5), wherein the coating 60 (see FIGS. 4A-4B, 5) preferably has a coating thickness 98 (see FIG. 5) of at least 0.25 inch. More preferably, the coating 60 has a coating thickness 98 (see FIG. 5) in a range of 0.25 inch to 0.5 inch.

Preferably, the plurality of high density metal pellets 66 is in an amount of at least 90% (ninety percent) by weight of the total weight percent of the coating 60. More preferably, the plurality of high density metal pellets 66 is in an amount in a range of 90% (ninety percent) by weight to 98% (ninety-eight percent) by weight of the total weight percent of the coating 60. The coating thickness 98 (see FIG. 5) and the amount of high density metal pellets 66 (see FIG. 5) are sufficient to provide an attenuation of vibration 100 (see FIG. 5) of the coated article 92*a* (see FIG. 5) and a reduced risk of unwanted ergonomic effects 102 (see FIG. 5).

Example

Testing was conducted to quantify the effects of increasing the overall mass of a heavy-duty rivet gun used in bolt installation for commercial aircraft assembly, and to determine whether the application of tungsten carbide weight to a rivet gun, thereby increasing the overall mass, provided any benefit to human users.

Modeling System Response.

Figure 10:
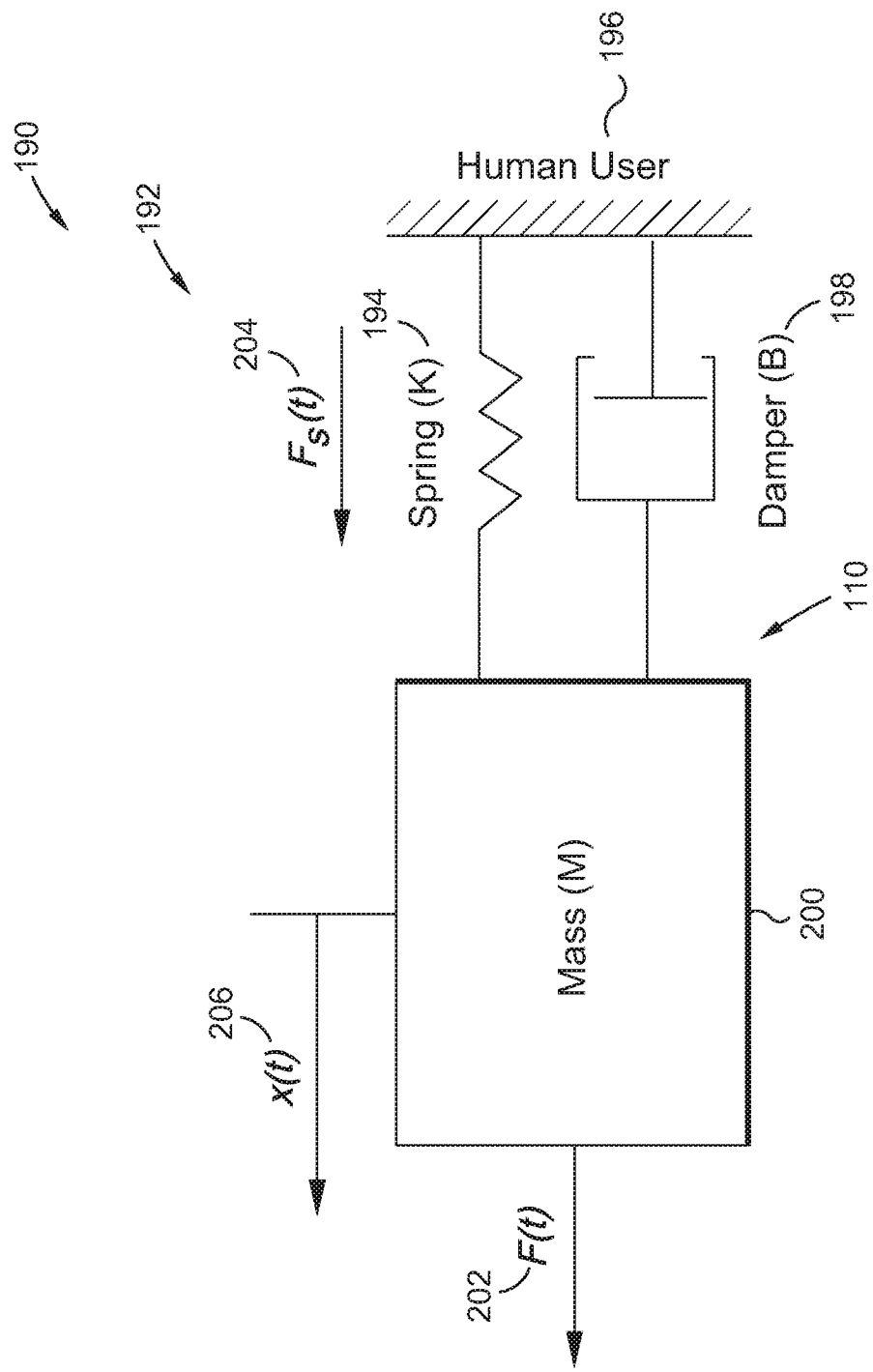
FIG. 10 is a schematic diagram of a spring-damper system representing a percussive process in relation to forces and mass used in test modeling for a coated percussive tool, such as a coated rivet gun, of the disclosure.

Now referring to FIG. 10, FIG. 10 is a schematic diagram of a spring-damper system 190 representing a percussive process 192 in relation to forces and mass used in test modeling for a coated percussive tool 108*a* (see FIG. 5), such as a coated rivet gun 110*a*. As shown in FIG. 10, a spring (K) 194 represents a compressive force, or back pressure that a human user 196 applies to keep a rivet gun 110 in contact with a bolt 28*b* (see FIG. 12). As further shown in FIG. 10, a damper (B) 198 represents a force that is absorbed by the human user 196. As further shown in FIG. 10, the complexity of all the dynamics associated with the rivet gun 110 are simplified as a single mass (M) 200 that exerts a force F(t) 202 in the same direction as a spring force $F_s(t)$ 204 and moves a distance x(t) 206 as a function of time.

It was hypothesized that an increase in mass (M) 200 (see FIG. 10) would lead to a drop in a DC gain seen by its transfer function of the spring-damper system 190 (see FIG. 10), the shift being drawn closer to zero, indicating the forces introduced to the damper (B) 198 (see FIG. 10) would zero out faster than the original response. A simpler analysis was considered, by assuming the force F(t) 202 (see FIG. 10) generated by the rivet gun 110 (see FIG. 10) was constant, regardless of the weight, since the internal pneumatics and input airline pressure were not modified. Likewise, the force required to insert the bolt over a fixed distance and interference fit all remained constant. Under these conditions, it was hypothesized that an increase in mass (M) 200 (see FIG. 10) would result in a decrease in acceleration (force (lbf)/ ↑mass (lb)=acceleration (in/s$^2$)↓), assuming this acceleration was responsible for the vibration or stresses felt by the human user 196 (see FIG. 10).

Method.

The rivet gun 110 (see FIGS. 5, 6A, 11) used for this testing was an Ingersoll Rand Model Number AVC27 rivet gun, obtained from Ingersoll Rand PLC of Davidson, N.C. The AVC27 rivet gun was coated with a coating 60 (see FIGS. 4A, 5), such as in the form of coating 60a (see FIG. 5), to obtain a coated rivet gun 110a (see FIG. 5). The coating 60 (see FIGS. 4A, 5), such as in the form of coating 60a (see FIG. 5), as discussed in detail above, comprised tungsten carbide pellets 66a (see FIG. 5) disposed in an adhesive material 62 (see FIG. 5), to obtain a metal adhesive matrix 70 (see FIGS. 4A, 5), and further comprised a cross-linked polyolefin heat shrink sleeve 84 (see FIG. 5) that was shrink-wrapped over the metal adhesive matrix 70 (see FIG. 5). The coating 60 (see FIGS. 4A, 5), such as in the form of coating 60a (see FIG. 5), increased the weight of the rivet gun by 1.47 lbs (pounds) from an initial weight of 5.18 lbs to a test weight of 6.65 lbs. The weight of the coating 60 (see FIGS. 4A, 5), such as in the form of coating 60a (see FIG. 5), was uniformly added around the entire length of the barrel 142 (see FIG. 6A) of the rivet gun 110 (see FIGS. 5, 6A). The handle substrate 94b (see FIG. 6A) was not coated for the testing.

Equipment.

In order to use the same AVC27 rivet gun in all tests, all tests for the coated rivet gun 110a (see FIG. 5) were first completed, then the coating 60, such as in the form of coating 60a, was removed to complete the remaining standard tests on the rivet gun 110 (see FIGS. 5, 6A) that was uncoated. The data for the automated test bench (ATB) was collected using a certified tension/compression load cell; a Keyence LK H-152 laser obtained from Keyence Corporation of America of Itasca, Ill.; a G.R.A.S. microphone obtained from G.R.A.S. Sound and Vibration of Twinsburg, Ohio; a National Instruments accelerometer obtained from National Instruments of Austin, Tex.; and a Venturi differential pressure sensor with negligible flow obstruction. Each Venturi differential pressure sensor was calibrated to collect data at either 25 kHz (kilo-Hertz) or 50 kHz. For the human user related tests, the load cell and laser displacement were removed to not hinder the human user's performance.

Testing Plan.

Figure 11:
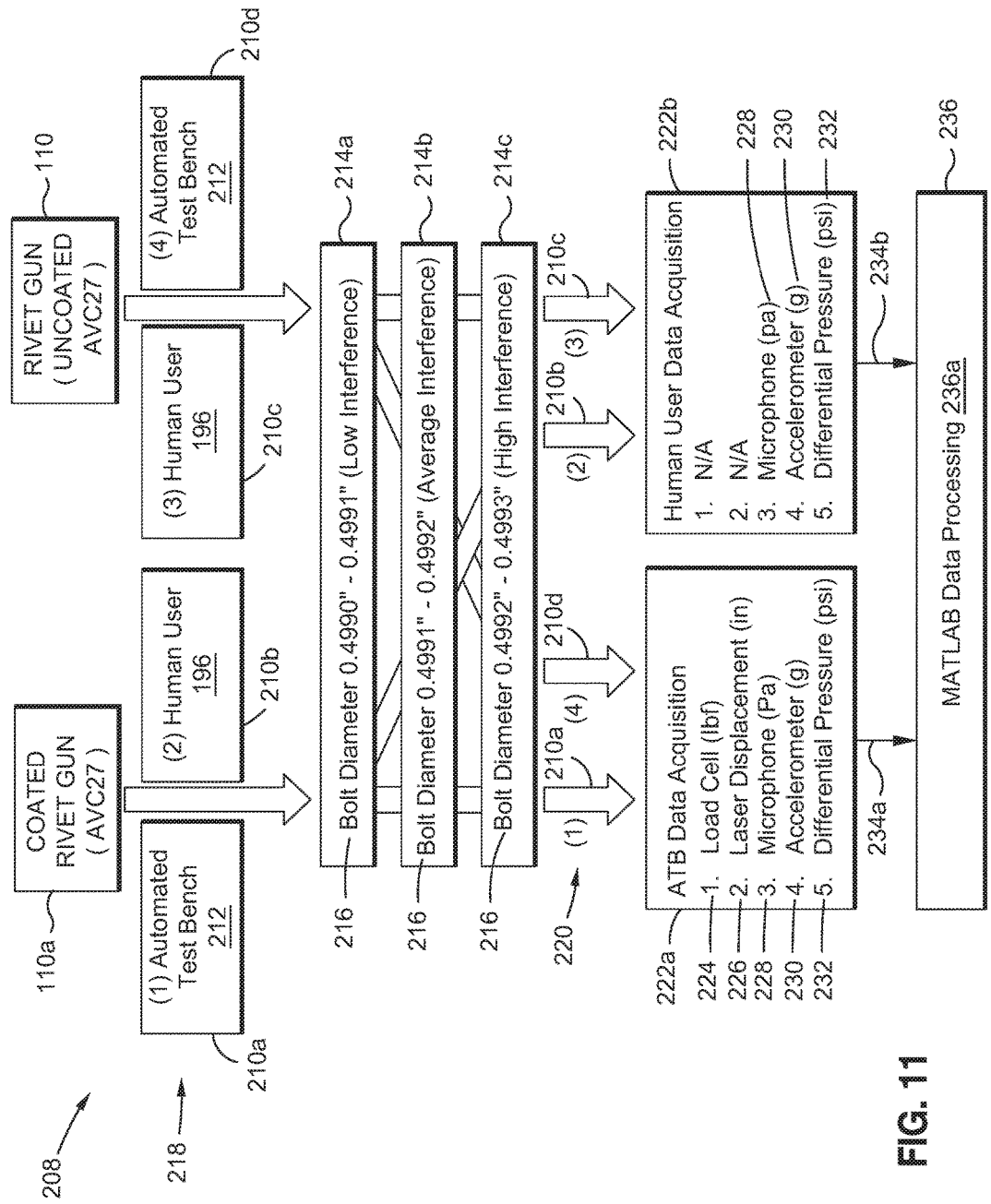
FIG. 11 is a schematic diagram of a testing plan for testing both a coated rivet gun coated with an embodiment of a coating of the disclosure, and a rivet gun without the coating of the disclosure.

Now referring to FIG. 11, FIG. 11 is a schematic diagram of a testing plan 208 for testing a rivet gun 110 (see FIGS. 5, 6A) coated with an embodiment of the coating 60 (see FIGS. 4A, 5), such as coating 60a (see FIG. 5), of the disclosure, and for testing a rivet gun 110 (see FIGS. 5, 6A) without the coating 60 (see FIGS. 4A, 5), such as coating 60a (see FIG. 5), i.e., standard rivet gun. As shown in FIG. 11, the testing plan 208 was defined by four (4) tests, including an automated test bench (ATB) test 210a, a human user test 210b, a human user test 210c, and an ATB test 210d. The four (4) tests 210a, 210b, 210c, 210d (see FIG. 11), were divided between the human user 196 (see FIG. 11) and the automated test bench (ATB) 212 (see FIG. 11). Each of the human user 196 and the ATB 212 tested both the coated rivet gun 110a and the rivet gun 110 that was uncoated.

The automated test bench (ATB) 212 (see FIG. 11) for the testing was modified with the following modifications: (1) a coupon mount was extended to fix a 1" (one inch) thick interference bolt coupon, and (2) two additional barrel clamps were added to accommodate the slightly over and under sized diameters of the coated rivet gun 110a (AVC27) and the rivet gun 110 (AVC27) that was uncoated. In addition to the ATB modifications, two new trigger mounts were designed with equal but negligible weight to preserve the 28% increase in mass (6.65 lb divided by 5.18 lb equals 1.28%). These trigger mounts were powered by a Festo pneumatic manifold system obtained from Festo of Hauppauge, N.Y., which provided consistent trigger pulls for each test.

A total of fifteen (15) bolts 28b (see FIG. 12) were installed for each of the four (4) tests 210a, 210b, 210c, 210d, and were subdivided into three (3) groups, by 0.0001" bolt diameter ranges, as shown in FIG. 11. As shown in FIG. 11, the three (3) groups included: (1) a low interference bolt group 214a with a bolt diameter 216 in a range of 0.4990" (inch) to 0.4991"; (2) an average interference bolt group 214b with a bolt diameter 216 in a range of 0.4991" (inch) to 0.4992"; and, (3) a high interference bolt group 214c with a bolt diameter 216 in a range of 0.4992" (inch) to 0.4993". Each respective bolt group 214a, 214b, 214c sampled five (5) bolts 28b (see FIG. 12). As further shown in FIG. 11, the order of testing was conducted with an in-sequence testing 218 of tests 210a, 210b, 210c, 210d, and was also conducted with a grouped testing 220 for ATB test 210a and ATB test 210d for the ATB 212 and for human user test 210b and human user test 210c for the human user 196. The grouped testing 220 (see FIG. 11) corresponded to additional sensors on the ATB 212 (see FIG. 11).

The interference fit for each bolt 28b (see FIG. 12) was calculated by finding the difference between the bolt diameter 216 (see FIG. 11) of the bolt 28b (see FIG. 12) and the hole diameter in an aluminum coupon 262 (see FIG. 12), according to their respective test/run. The calculated range for the four (4) tests 210a, 210b, 210c, 210d (see FIG. 11), were within 0.00006" (inch) of one another, in essence zero when considering the limitations of the micrometers used. There was no significant difference in interference fits for both the coated rivet gun 110a (i.e., tungsten carbide coated rivet gun) and the rivet gun 110 that was uncoated (i.e., standard rivet gun).

A total of 30 (thirty) installations were performed for each of the two configurations of the coated rivet gun 110a (see FIG. 11) and the rivet gun 110 (see FIG. 11) that was uncoated. All of the 30 (thirty) installations were performed with identical testing parameters, apart from the difference in weight.

As further shown in FIG. 11, automated test bench (ATB) data acquisition 222a for the grouped testing 220 for ATB test 210a and ATB test 210d for the ATB 212 included: load cell (pound force (lbf)) 224, laser displacement (inch (in)) 226, microphone (Pascals (Pa)) 228, accelerometer (gram (g)) 230, and differential pressure (pounds per square inch (psi)) 232. As further shown in FIG. 11, human user data acquisition 222b for the grouped testing 220 for human user test 210b and human user test 210c for the human user 196 included, microphone (Pascals (Pa)) 228, accelerometer (gram (g)) 230, and differential pressure (pounds per square inch (psi)) 232, and load cell (pound force (lbf)) 224 and laser displacement (inch (in)) 226 were not applicable (N/A).

As further shown in FIG. 11, after the data acquisition was performed, automated test bench (ATB) data 234a and human user data 234b were processed via data processing 236, such as MATLAB computer software data processing 236a. MATLAB (matrix laboratory) computer software was obtained from MathWorks, Inc. of Natick, Mass. (MATLAB is a registered trademark of Mathworks, Inc. of Natick, Mass.)

Figure 12:
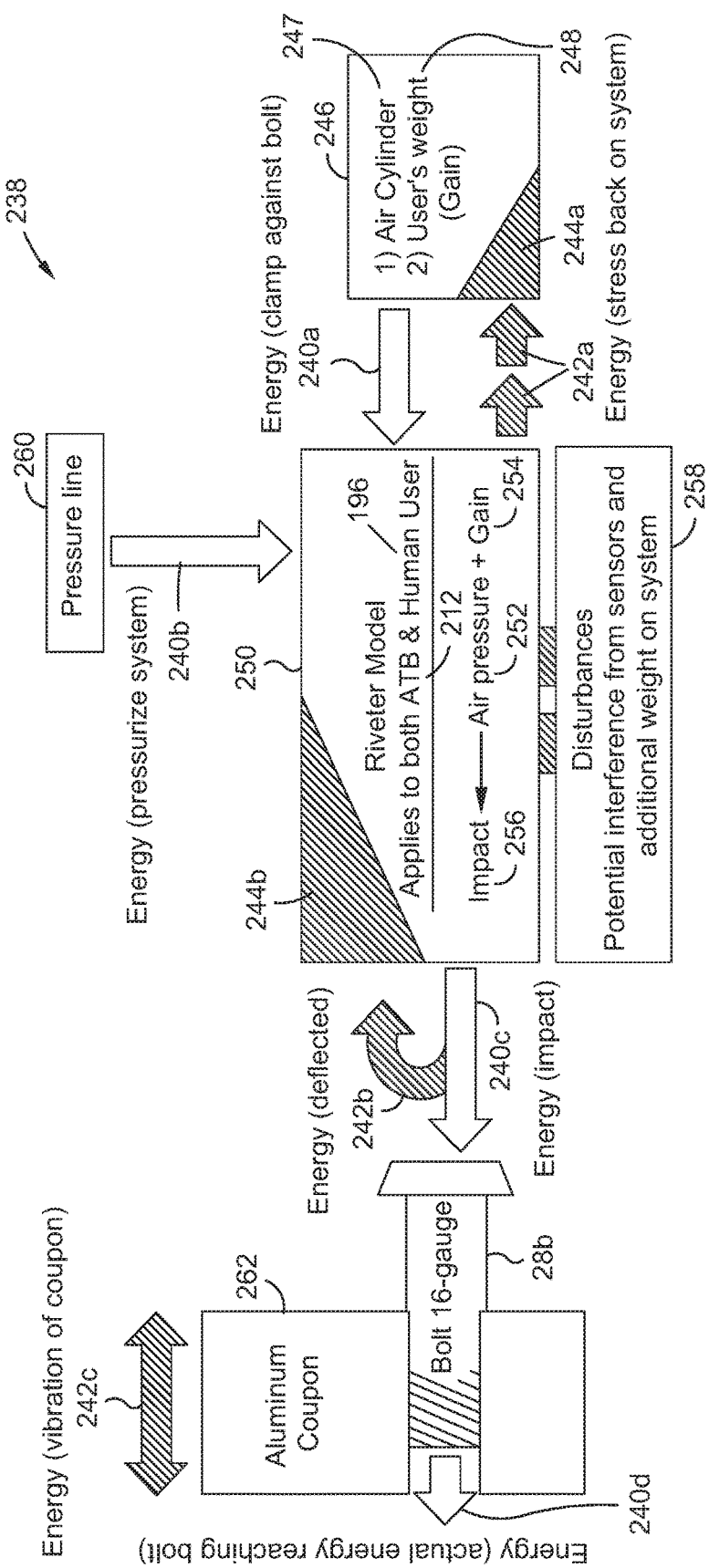
FIG. 12 is a schematic diagram of a bolt installation system representative of both an automated test bench (ATB) and a human user.

Now referring to FIG. 12, FIG. 12 is a schematic diagram of a bolt installation system 238 representative of both an automated test bench (ATB) 212 and a human user 196. Before conducting the testing, it was important to identify the flow of energy, the known energy losses with their locations, and the potential disturbances that may or may not affect the performance of bolt installation.

As shown in FIG. 12, desired flows or uses of energy are indicated by energy (clamp against bolt) 240a, energy (pressurize system) 240b, energy (impact) 240c, and energy (actual energy reaching bolt) 240d. As further shown in FIG. 12, losses of energy are indicated by energy (stress back on system) 242a, energy (deflected) 242b, and energy (vibration of coupon) 242c. As further shown in FIG. 12, components affected by deflection are indicated by component 244a of bolt installer 246, which is affected by deflection of energy (stress back on system) 242a, and component 244b of riveter model 250, which is affected by deflection of energy (deflected) 242b.

As further shown in FIG. 12, the bolt installer 246 may include an air cylinder 247 of the ATB 212 or a human user's weight 248 of the human user 196. Energy flow from energy (clamp against bolt) 240a is transferred from the bolt installer 246 to the riveter model 250. Loss of energy from energy (stress back on system) 242a (see FIG. 12) may occur at the location of the bolt installer 246 (see FIG. 12).

The riveter model 250 (see FIG. 12) applies to both the ATB 212 (see FIG. 12) and the human user 196 (see FIG. 12). As shown in FIG. 12, air pressure 252 from the air cylinder 246 and gain 254 from the human user's weight 248 provide an impact 256, and energy flow from the energy (impact) 240c is transferred from the riveter model 250 to the bolt 28b. Loss of energy from energy (deflected) 242b (see FIG. 12) may occur at the location of the riveter model 250 (see FIG. 12).

As further shown in FIG. 12, disturbances 258, such as from potential interference from sensors and additional weight on the bolt installation system 238, may or may not affect the performance of the bolt 28b installation. As further shown in FIG. 12, energy flow from the energy (pressurize system) 240b is transferred from a pressure line 260 to the riveter model 250.

As further shown in FIG. 12, the bolt 28b, in the form of a 16-gauge bolt, is installed in an aluminum coupon 262. Energy flow from energy (actual energy reaching the bolt) 240d (see FIG. 12) is transferred out of the bolt 28b (see FIG. 12). Loss of energy from energy (vibration of coupon) 242c (see FIG. 12) may occur at the location of the aluminum coupon 262 (see FIG. 12).

Results of Testing.

Automated test bench (ATB) data 234a (see FIG. 11) and human user data 234b (see FIG. 11) for the four (4) tests 210a, 210b, 210c, 210d (see FIG. 11) were successfully collected, under the conditions discussed above.

Cycle Time and Required Number of Hits Results.

The cycle time and number of hits required for the bolt to be fully seated were determined from the laser displacement curve, which was then confirmed by the microphone output—for the ATB. These results indicated a slight decrease in the number of hits required for the standard uncoated rivet gun. In ten (10) instances the standard uncoated rivet gun was shown to fully seat the bolt in one or two less strikes. The small number of tests completed made it difficult to determine if the reduction in impacts for the standard uncoated rivet gun was an anomaly or a real affect.

For the human user, the number of required impacts was based only on the microphone data. A single-blind method was used to subjectively count the impacts in order to remove any bias. An accurate cycle time could not be produced from the microphone data, considering that final time does not coincide with the microphone peak but instead falls between peaks. The number of impacts for the human user using the coated rivet gun (i.e., tungsten carbide coated rivet gun) required one or two less impacts.

Air Consumption Analysis (Control).

The Venturi differential pressure sensor monitored the pressure (air) line 260 (see FIG. 12) dedicated to the rivet gun for changes in pressure, which correlated with the slug firing and internal pressure chamber refilling. A differential pressure value at zero represented a constant (static) pressure, or no activity. This data was used to assure that all tests were run under the same conditions with respect to the supply air pressure and flow. Small changes to the input pressure and flow would have a dramatic effect on the installation time. The differential pressure data was quantified by integrating the pressure with respect to time, and then divided by the total number of hits for each respective test. This data was used to relate each of the four (4) tests 210a, 210b, 210c, 210d (see FIG. 11) together, and verified whether the average air consumption per hit of the system was over or under cycling. While the results did not significantly differ between the coated rivet gun 110a (i.e., tungsten carbide coated rivet gun) and the rivet gun 110 that was uncoated (i.e., standard rivet gun), the standard rivet gun tests cycled with slightly higher differential pressures, which may have led to slightly improved cycle times.

Bolt Displacement and Acceleration Curve Results.

The data acquired from the Keyence laser captured the motion of the rivet gun from the time of clamping to being fully seated. The raw data was normalized to represent the initial clamping as the zero point. Any positive slope represented the insertion progress on the bolt. Negative slopes for the deflection kicked the human user back. The displacement steps were identified by measuring the difference between each of the peak values. The displacement data was also used to determine the uniaxial acceleration profile by taking the second-derivative of the displacement with respect to time. The accelerometer sensor was ideal for sampling the overall vibration of the system but the laser was capable of providing the acceleration associated with only uniaxial deflection. The acceleration curve was conditioned with Gaussian Kernel Smoothing (ksdensity in MATLAB) to observe the slope trend. The findings indicated that acceleration associated with driving the bolt inward remained more consistent and over a longer duration than the deflection period, which was seen more as an impulse.

Both the displacement and acceleration curve data alone did not show a significant difference between the coated rivet gun 110a (i.e., tungsten carbide coated rivet gun) and the rivet gun 110 that was uncoated (i.e., standard rivet gun). The results of the displacement steps varied even between identical tests, thus indicating the need for higher power of study and/or presence of disturbances (variables unable to be accounted for at this time such as the starting position of the slug).

Accelerometer Analysis.

The accelerometer data between all four (4) tests 210a, 210b, 210c, 210d (see FIG. 11) varied and could not be normalized to be compared on a time-scale. Instead a Fourier Transformation was applied to the pertinent segment of the data that aligned with the time of the first to final impact. This allowed for the data to be viewed in for its frequency and power. While it was unclear whether the lower power of the accelerometer for the coated rivet gun 110a (i.e., tungsten carbide coated rivet gun) represented better performance, the results of the coated rivet gun 110a (i.e., tungsten carbide coated rivet gun) and the rivet gun 110 that was uncoated (i.e., standard rivet gun) were distinct.

Loading Profile and Performance Results.

The data from the load cell (lbf) 224 (see FIG. 11) indicated the coated rivet gun 110a (i.e., tungsten carbide coated rivet gun) measured lower forces than the rivet gun 110 that was uncoated (i.e., standard rivet gun). The results showed a reduction in peak loading experienced by the back end of the rivet gun.

Now referring to FIGS. 13A and 13B, FIG. 13A is a loading profile graph 264 for measurements from a load cell 224 (see FIG. 11) for the coated rivet gun 110a (see FIG. 11) (i.e., tungsten carbide coated rivet gun), coated with an embodiment of a coating 60 (see FIGS. 4A, 5), such as coating 60a (see FIG. 5), of the disclosure. As shown in FIG. 13A, the y-axis plots tungsten carbide load cell (lbf) data 266, and the x-axis plots time (seconds) data 268. The tungsten carbide load cell (lbf) data 266 begins with an approximate preload of 43 lbf. A reference line 270 (see FIG. 13A) for the tungsten carbide load cell (lbf) data 266 is shown at 250 lbf. Positive compressive force data 272 (see FIG. 13A) is shown above the reference line 270 (see FIG. 13A). Lower force data 274 (see FIG. 13A) is shown below the reference line 270 (see FIG. 13A).

FIG. 13B is a loading profile graph 276 for measurements from a load cell 224 (see FIG. 11) for the rivet gun 110 (see FIG. 11) that was uncoated (i.e., standard rivet gun). As shown in FIG. 13B, the y-axis plots standard load cell (lbf) data 278, and the x-axis plots time (seconds) data 268. The standard load cell (lbf) data 278 begins with an approximate preload of 43 lbf. A reference line 280 (see FIG. 13B) for the standard load cell (lbf) data 278 is shown at 250 lbf. Positive compressive force data 282 (see FIG. 13B) is shown above the reference line 280 (see FIG. 13B). Lower force data 284 (see FIG. 13B) is shown below the reference line 280 (see FIG. 13B).

From this test, it was quantified that increasing mass to a standard rivet gun resulted in reducing the forces transferring to the back of the standard rivet gun. However, this observation alone did not represent performance capabilities of installing bolts. In order to determine whether performance was compromised in exchange for the reduced forces, force-displacement associated with their respective load cell results was analyzed.

Force-Displacement Results.

Figure 14:
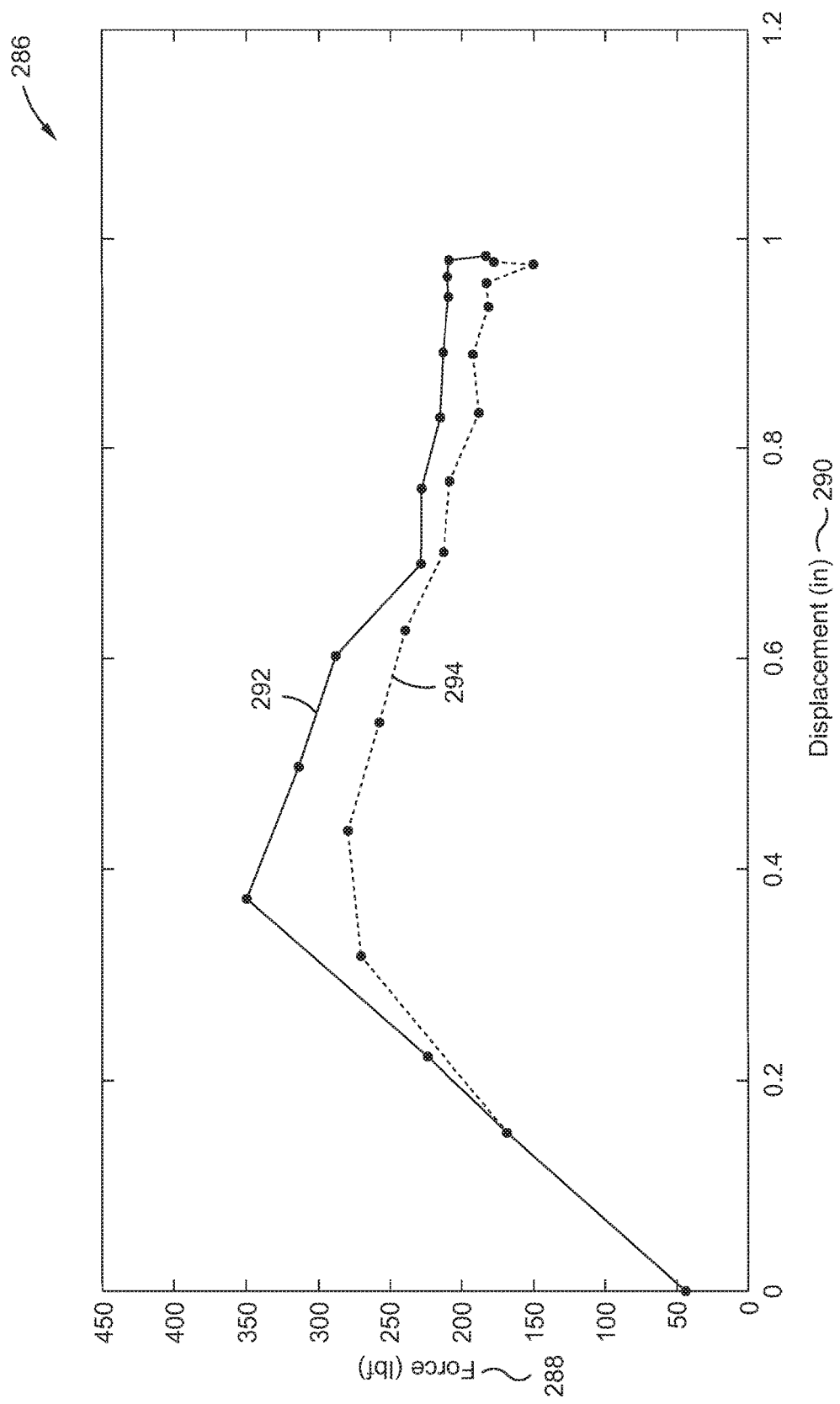
FIG. 14 is an average force-displacement graph showing force-displacement curve summaries of the average force-displacements for a coated rivet gun, coated with an embodiment of a coating of the disclosure, and a rivet gun without the coating of the disclosure.

Now referring to FIG. 14, FIG. 14 is an average force-displacement graph 286 showing force-displacement curve summaries of the average force-displacements for the coated rivet gun 110a (see FIG. 11) (i.e., tungsten carbide coated rivet gun) coated with an embodiment of a coating 60 (see FIGS. 4A, 5) of the disclosure, and a rivet gun 110 (see FIG. 11) without the coating 60 of the disclosure (i.e., standard rivet gun). FIG. As shown in FIG. 14, the y-axis plots force (lbf (pound force)) data 288 and the x-axis plots displacement (in (inch)) data 290. FIG. 14 shows an average force-displacement plot 292 for the rivet gun 110 (see FIG. 11) that was uncoated (i.e., standard rivet gun). FIG. 14 further shows an average force-displacement plot 294 for the coated rivet gun 110a (see FIG. 11) (i.e., tungsten carbide coated rivet gun).

As shown in FIG. 14, the average force-displacement plot 294 for the coated rivet gun 110a (see FIG. 11) (i.e., tungsten carbide coated rivet gun) had a lower force-displacement than the average force-displacement plot 292 for the rivet gun 110 (see FIG. 11) that was uncoated (i.e., standard rivet gun), and the coated rivet gun 110a (see FIG. 11) (i.e., tungsten carbide coated rivet gun) occupied the majority of the lower portion of the y-axis.

It was noted that after the initial impacts, the tungsten carbide coated rivet gun and the standard rivet gun were similar in step-length along the displacement-axis. From various test runs, the standard rivet gun dominated the upper portion of the y-axis in the first half of bolt installation, then proceeded to converge with the force-displacement plots of the tungsten carbide coated rivet gun near the end. By averaging the plots, the unique performance trends for both the standard rivet gun and the tungsten carbide coated rivet gun were easily visualized. While the sample size for each specified test was low, it was clear that the increase in mass reduced the force experienced by a human user without significant loss in performance. The findings indicated the addition of mass resulted in lower forces felt by the human user at the back of the rivet gun, while performance between the standard rivet gun and the tungsten carbide coated rivet gun remained relatively constant.

For certain test runs for the tungsten carbide coated rivet gun and the standard rivet gun, the standard rivet gun produced greater forces. However, the standard rivet gun displaced the bolt further into the aluminum coupon during the first impact. Thus, it was difficult to draw conclusions by inspecting only the first one or two impacts, considering the starting position of the slug being unknown, and the position being proportional to the distance for the slug to gain momentum for the initial strike. Additionally, the differential pressure of the standard rivet gun was more than one (1) standard-deviation higher, while 4 of the 5 tungsten carbide coated rivet gun tests remained within half a deviation, indicating some variation in air pressure.

Disclosed embodiments of the coating 60 (see FIGS. 4A, 5), the coating system 90 (see FIGS. 4B, 5), the method 150 (see FIG. 7), the method 160 (see FIG. 8), and the method 170 (see FIG. 9) provide for applying or bonding a high density metal material 68 (see FIG. 5), such as in the form of high density metal pellets 66 (see FIG. 5), with an adhesive material 62 (see FIG. 5), such as with a mastic viscoelastic adhesive 62b (see FIG. 5), to an article 92 (see FIG. 5), such as a percussive tool 108 (see FIG. 5), in the form of a rivet gun 110 (see FIG. 5), and applying a polymer material 78 (see FIG. 5), such as in the form of a polymer material sleeve 82 (see FIG. 5) over the high density metal material 68 and adhesive material 62. The high density metal material 68 (see FIG. 5), such as in the form of high density metal pellets 66 (see FIG. 5), for example, tungsten carbide pellets 66a (see FIG. 5), or shot, may be laminated via lamination 71 (see FIG. 5). Moreover, a barrel substrate 94a of the percussive tool 108 (see FIG. 5), such as the rivet gun 110 (see FIG. 5), may be covered with a polymer material heat shrink sleeve 83 (see FIG. 5) that is heat shrink wrapped to conform and protect the laminated high density metal pellets 66 (see FIG. 5), for example, tungsten carbide pellets 66a (see FIG. 5), inside as an additional protection and containment. The handle substrate 94b (see FIG. 5) of the rivet gun 110 (see FIG. 5) may have a custom formed rubber grip and may then be shrink wrapped with the polymer material 78 (see FIG. 5), such as polyolefin 80a (see FIG. 5), as well. A left handed, a right handed, or an ambidextrous percussive tool 108 (see FIG. 5), such as in the form of a rivet gun 110 (see FIG. 5), may be made available to further reduce the vibratory impact to the user's body through shock absorption and a load transfer from the joint between the forefinger and thumb to the entire palm instead.

Further, disclosed embodiments of the coating 60 (see FIGS. 4A, 5), the coating system 90 (see FIGS. 4B, 5), the method 150 (see FIG. 7), the method 160 (see FIG. 8), and the method 170 (see FIG. 9) may provide numerous advantages, including but not limited to, an attenuation of vibration 100 (see FIG. 5) or a decreased vibration transmission, a reverberated energy that directs reverberated energy back into the fastener or rivet versus the human user 196 (see FIG. 11) or operator, and an energy repelled back to the fastener 28 (see FIG. 1), such as the rivet 28a (see FIG. 1), or the bolt 28b (see FIG. 12), and may protect a user's fingers, hands, arms, shoulders, and lower back. The high density metal material 68 (see FIG. 5), such as in the form of high density metal pellets 66 (see FIG. 5), for example, tungsten carbide pellets 66a (see FIG. 5), or shot, preferably work in conjunction with the viscoelastic properties of the mastic binder as a shock absorbing sleeve that is attached around the barrel 142 (see FIG. 6A) of the percussive tool 108 (see FIG. 6A) by a cross-linked polyolefin heat shrink sleeve 84 (see FIG. 5). The high density metal pellets 66 (see FIG. 5), such as tungsten carbide pellets 66a (see FIG. 5), glued together with a viscoelastic bonding technique allow the high density metal pellets 66 (see FIG. 5), such as tungsten carbide pellets 66a (see FIG. 5), to absorb the shock of the rivet gun's vibration. The vibratory deadening results may reduce impact to the hand and machine being subject to the shock. Several actual production tests showed the drive time of a rivet was significantly reduced, along with much less musculoskeletal and myofascial issues. In addition, it was found that when the coated percussive tool 108a, such as the coated rivet gun 110a (see FIG. 5) was used by human users 196 (see FIG. 11), vibration exposure decreased from 64 m/s$^2$ to 10 m/s$^2$. Thus, the coating 60 (see FIGS. 4A, 5), the coating system 90 (see FIGS. 4B, 5), may provide a reduced vibratory impact and a reduced force transfer. The mass-enhanced, coated article 92a, such as the coated rivet gun 110a (see FIG. 5) may make percussive fastening tasks easier for users, such as mechanics, while improving product quality. For example, users, such as mechanics, may have increased control over the coated rivet gun 110a (see FIG. 5) because of the reduced exposure to vibration. In addition, users, such as mechanics may be less fatigued and as a result, more efficient and alert.

Moreover, disclosed embodiments of the coating 60 (see FIGS. 4A, 5), the coating system 90 (see FIGS. 4B, 5), the method 150 (see FIG. 7), the method 160 (see FIG. 8), and the method 170 (see FIG. 9) may provide a reduced risk of unwanted ergonomic effects 102 (see FIG. 5) and improved ergonomics and safety for those users, such as mechanics, performing high impact, percussive fastening work or tasks.

In addition, disclosed embodiments of the coating 60 (see FIGS. 4A, 5), the coating system 90 (see FIGS. 4B, 5), the method 150 (see FIG. 7), the method 160 (see FIG. 8), and the method 170 (see FIG. 9) may provide reduced fastener or rivet drive time and decreased fastener or rivet installation time. For example, mechanics testing the mass-enhanced, coated article 92a (see FIGS. 5, 6C), such as the coated percussive tool 108a (see FIGS. 5, 6C), for example, the coated rivet gun 110a (see FIGS. 5, 6C), on aircraft wing panels 26 (see FIG. 1), discovered a reduction of drive time on a fasterner 28 (see FIG. 1), such as a rivet 28a (see FIG. 1). Thus, productivity may be increased. Adhering or bonding the high density metal pellets 66 (see FIG. 5), such as tungsten carbide pellets 66a (see FIG. 5), to an article 92 (see FIG. 5), such as a percussive tool 108 (see FIG. 5), in the form of a rivet gun 110 (see FIG. 5), with a mastic viscoelastic may increase the impact of the rivet gun and may complement the gains made on the bucking bar side of fastening. Rivet guns may also frequently be used for non-riveting tasks, such as setting interference and transition fit fasteners, so this solution may be applied anywhere rivet guns are used.

Further, disclosed embodiments of the coating 60 (see FIGS. 4A, 5), the coating system 90 (see FIGS. 4B, 5), the method 150 (see FIG. 7), the method 160 (see FIG. 8), and the method 170 (see FIG. 9) may provide an effective solution that is easy to apply to known rivet guns 110 (see FIG. 6A) and standard rivet gun equipment. In addition, the cost and labor hours to make the coated percussive tool 108a (see FIGS. 5, 6C), such as the coated rivet gun 110a (see FIGS. 5, 6C), are low, and the materials for customization are easily obtained. Moreover, the coated percussive tool 108a (see FIGS. 5, 6C), such as the coated rivet gun 110a (see FIGS. 5, 6C), is easy to replicate. The potential for replication may be anywhere percussive fastening is performed, and the solution may be especially effective for larger interference bolts and rivets where user or mechanic ergonomics may be more challenging.

In addition, disclosed embodiments of the coating 60 (see FIGS. 4A, 5), the coating system 90 (see FIGS. 4B, 5), the method 150 (see FIG. 7), the method 160 (see FIG. 8), and the method 170 (see FIG. 9) may provide a reduction in die and gun tool marks due to improved stability of the mass enhanced, coated article 92 (see FIG. 5), such as the coated rivet gun 110a (see FIG. 5). The polymer material 78 (see FIG. 5), such as in the form of the cross-linked polyolefin heat shrink sleeve 84 (see FIG. 5), provides added protection to prevent tool marks on the fastened or riveted structures or parts. Moreover, there may be reduced gapped heads on the fasteners 28 (see FIG. 1), such as rivets 28a (see FIGS. 1, 6F) or bolts 28b (see FIG. 12), due to better efficiency of impact.

Further, the coating 60 (see FIGS. 4A, 5) may have the ability to change one or more frequencies transferred to the handle portion 144 (see FIG. 6A) of the rivet gun 110 (see FIG. 6A) and further transferred into the hand, elbow, head, or other body parts of a user of the rivet gun 110 (see FIG. 6A). Thus, certain frequencies that may cause unwanted physical effects to a user may be changed to frequencies that do not cause unwanted physical effects, by using the coated article 92a (see FIG. 5), such as the coated percussive tool 108a, for example, the coated rivet gun 110a, during riveting.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A coating applied to an article, the coating comprising:
an adhesive material, in contact with at least one substrate of the article;
a plurality of high density metal pellets disposed in the adhesive material, to form a metal adhesive matrix, the plurality of high density metal pellets being in an amount of at least 90% (ninety percent) by weight of the total weight percent of the coating, and each high density metal pellet having a diameter of at least 0.04 inch; and
a polymer material applied over the metal adhesive matrix, wherein obtaining a mass-enhanced, coated article, the coating having a coating thickness of at least 0.25 inch, and the coating thickness and the amount of high density metal pellets being sufficient to provide an attenuation of vibration of the coated article and a reduced risk of unwanted ergonomic effects.

2. The coating of claim 1, wherein the article comprises one of, an implement, a tool, a percussive tool including a rivet gun, a bucking bar, a handle, or a glove.

3. The coating of claim 1, wherein the adhesive material is a binder material and comprises one or more of, a viscoelastic adhesive, a mastic viscoelastic adhesive, a hot-melt adhesive, a spray adhesive, a liquid adhesive, an adhesive glue, or a pressure sensitive adhesive.

4. The coating of claim 1, wherein each high density metal pellet comprises a high density metal material comprising one or more of, tungsten carbide, tungsten, iron, copper, nickel, lead, molybdenum, steel, inconel, platinum, tin, silver, zinc, bronze, or alloys of one or more of the high density metal materials thereof.

5. The coating of claim 1, wherein the diameter of each high density metal pellet is in a range of 0.04 inch to 0.10 inch, and further wherein each tungsten carbide pellet has a shape comprising one of, a spherical shape, a rod shape, an elliptical shape, or a disk shape.

6. The coating of claim 1, wherein the polymer material comprises a polymer comprising one of, polyolefin, polyethylene (PE), polypropylene (PP), nylon, polytetrafluoroethylene (PTFE), fluorinated ethylene propylene (FEP), perfluoroalkoxy alkanes (PFA), ethylene tetrafluoroethylene (ETFE), polyester, polyether ether ketone (PEEK), polyvinyl chloride (PVC), polyimide (PI), polyamide, polyurethane (PU), polystyrene (PS), polyvinylidene fluoride (PVDF), or polyvinyl acetate (PVAC).

7. The coating of claim 1, wherein the polymer material comprises a cross-linked polyolefin heat shrink sleeve.

8. The coating of claim 1, wherein the coating thickness is in a range of 0.25 inch to 0.5 inch.

9. The coating of claim 1, wherein:
the amount of high density metal pellets comprises 90% to 98% by weight of the total weight percent of the coating;
the adhesive material is in an amount comprising 1% to 9% by weight of the total weight percent of the coating; and
the polymer material is in an amount comprising 1% to 5% by weight of the total weight percent of the coating.

10. A coating applied to a percussive tool, the coating comprising:
an adhesive material, in contact with at least one substrate of the percussive tool;
a plurality of tungsten carbide pellets disposed in the adhesive material, to form a metal adhesive matrix, the plurality of tungsten carbide pellets being in an amount of at least 90% (ninety percent) by weight of the total weight percent of the coating, and each tungsten carbide pellet having a diameter of at least 0.04 inch; and
a polymer material applied over the metal adhesive matrix,
wherein obtaining a mass-enhanced, coated percussive tool, the coating having a coating thickness of at least 0.25 inch, and the coating thickness and the amount of tungsten carbide pellets being sufficient to provide an attenuation of vibration of the coated percussive tool and a reduced risk of unwanted ergonomic effects.

11. The coating of claim 10, wherein the percussive tool comprises a rivet gun, and the coating is applied to a barrel substrate of the rivet gun.

12. The coating of claim 11, wherein the coating is further applied to a handle substrate of the rivet gun.

13. The coating of claim 10, wherein the adhesive material is a binder material and comprises one or more of, a viscoelastic adhesive, a mastic viscoelastic adhesive, a hot-melt adhesive, a spray adhesive, a liquid adhesive, an adhesive glue, or a pressure sensitive adhesive.

14. The coating of claim 10, wherein the polymer material comprises a cross-linked polyolefin heat shrink sleeve.

15. A coating system comprising:
an article having at least one substrate configured to be coated; and
a coating comprising:
an adhesive material;
a plurality of high density metal pellets disposed in the adhesive material, to form a metal adhesive matrix, the plurality of high density metal pellets being in an amount of at least 90% (ninety percent) by weight of the total weight percent of the coating, each high density metal pellet having a diameter of at least 0.04 inch; and
a polymer material applied over the metal adhesive matrix,
wherein obtaining a mass-enhanced, coated article, the adhesive material of the coating being in contact with the at least one substrate, and the coating having a coating thickness of at least 0.25 inch, and the coating thickness and the amount of high density metal pellets being sufficient to provide an attenuation of vibration of the coated article and a reduced risk of unwanted ergonomic effects.

16. The coating system of claim 15, wherein the article comprises one of, an implement, a tool, a percussive tool including a rivet gun, a bucking bar, a handle, or a glove.

17. The coating system of claim 15, wherein the adhesive material is a binder material and comprises one or more of, a viscoelastic adhesive, a mastic viscoelastic adhesive, a hot-melt adhesive, a spray adhesive, a liquid adhesive, an adhesive glue, or a pressure sensitive adhesive.

18. The coating system of claim 15, wherein each high density metal pellet comprises a high density metal material comprising one or more of, tungsten carbide, tungsten, iron, copper, nickel, lead, molybdenum, steel, inconel, platinum, tin, silver, zinc, bronze, or alloys of one or more of the high density metal materials thereof.

19. The coating system of claim 15, wherein the polymer material comprises a polymer comprising one of, polyolefin, polyethylene (PE), polypropylene (PP), nylon, polytetrafluoroethylene (PTFE), fluorinated ethylene propylene (FEP), perfluoroalkoxy alkanes (PFA), ethylene tetrafluoroethylene (ETFE), polyester, polyether ether ketone (PEEK), polyvinyl chloride (PVC), polyimide (PI), polyamide, polyurethane (PU), polystyrene (PS), polyvinylidene fluoride (PVDF), or polyvinyl acetate (PVAC).

20. The coating system of claim 15, wherein the polymer material comprises a polymer material sleeve applied over the metal adhesive matrix.

\* \* \* \* \*